US010849106B2

(12) United States Patent
Abedini et al.

(10) Patent No.: US 10,849,106 B2
(45) Date of Patent: Nov. 24, 2020

(54) DELIVERY OF SYSTEM INFORMATION

(71) Applicant: QUALCOMM Incorporated, San Diego, CA (US)

(72) Inventors: Navid Abedini, Raritan, NJ (US); Muhammad Nazmul Islam, Edison, NJ (US); Jianghong Luo, Skillman, NJ (US); Sundar Subramanian, San Diego, CA (US); Junyi Li, Chester, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/031,758

(22) Filed: Jul. 10, 2018

(65) Prior Publication Data

US 2019/0053196 A1 Feb. 14, 2019

Related U.S. Application Data

(60) Provisional application No. 62/543,649, filed on Aug. 10, 2017.

(51) Int. Cl.
*H04W 72/04* (2009.01)
*H04W 48/12* (2009.01)
(Continued)

(52) U.S. Cl.
CPC ............ *H04W 72/04* (2013.01); *H04W 4/02* (2013.01); *H04W 16/28* (2013.01); *H04W 48/12* (2013.01)

(58) Field of Classification Search
CPC ... H04W 48/08; H04W 74/006; H04W 16/28; H04W 72/04
See application file for complete search history.

(56) References Cited

U.S. PATENT DOCUMENTS 8,837,443 B2 * 9/2014 Yamada .................. H04L 47/12
370/230
8,868,086 B2 10/2014 Lee et al.
(Continued)

FOREIGN PATENT DOCUMENTS

WO WO2016198909 A1 12/2016
WO WO2016195617 A9 9/2017

OTHER PUBLICATIONS

International Search Report and Written Opinion—PCT/US2018/041587—ISA/EPO—dated Nov. 19, 2018.
(Continued)

*Primary Examiner* — Shukri Taha
(74) *Attorney, Agent, or Firm* — Linda G. Gunderson; Holland & Hart LLP

(57) ABSTRACT

Methods, systems, and devices for delivering system information (SI) in a wireless communications system are described. Approaches described herein include determining different sets of SI corresponding to different sets of devices that might use the SI, and using directional transmissions to transmit the different sets of SI in different directions, so as to only transmit in a given direction SI that may be useful for devices in that direction. Also described herein are approaches for dividing a set of SI into different portions, and transmitting one portion via one or more reference signals and another portion less frequently via a scheduled data channel.

30 Claims, 13 Drawing Sheets

(51) Int. Cl.
*H04W 4/02* (2018.01)
*H04W 16/28* (2009.01)

(56) References Cited

U.S. PATENT DOCUMENTS

| | | | |
|---|---|---|---|
| 9,369,946 | B2 | 6/2016 | Plicanic Samuelsson et al. |
| 9,713,148 | B2* | 7/2017 | Mochizuki ........ H04W 72/0453 |
| | | | 370/329 |
| 10,243,642 | B2* | 3/2019 | You ...................... H04B 7/0695 |
| 2014/0112220 | A1 | 4/2014 | Kwak et al. |
| 2015/0327155 | A1* | 11/2015 | Lee ....................... H04W 76/14 |
| | | | 370/329 |
| 2015/0382284 | A1* | 12/2015 | Brismar ................ H04W 74/04 |
| | | | 370/329 |
| 2016/0165606 | A1 | 6/2016 | Rashid et al. |
| 2016/0205671 | A1* | 7/2016 | Tabet .................. H04W 72/042 |
| | | | 370/329 |
| 2017/0311342 | A1 | 10/2017 | You et al. |
| 2018/0097547 | A1* | 4/2018 | Turtinen .............. H04B 7/0617 |
| 2019/0132749 | A1* | 5/2019 | Wei ...................... H04W 48/08 |
| 2019/0223156 | A1* | 7/2019 | Fujishiro ................. H04W 4/06 |

OTHER PUBLICATIONS

Partial International Search Report—PCT/US2018/041587—ISA/EPO—dated Sep. 26, 2018.

* cited by examiner

DELIVERY OF SYSTEM INFORMATION

CROSS REFERENCES

The present application for patent claims benefit of U.S. Provisional Patent Application No. 62/543,649 by Abedini et al., entitled "DELIVERY OF SYSTEM INFORMATION," filed Aug. 10, 2017, and expressly incorporated by reference in its entirety.

BACKGROUND

The following relates generally to wireless communication, and more specifically to delivery of system information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

A base station may wirelessly transmit system information (SI) to enable other devices to establish wireless communications with the base station. Those other devices may differ in their SI requirements as well as in the resources the devices may use to thereafter establish wireless communications with the base station. Similarly, aspects of SI may differ in terms of how often other devices require the SI. Methods to efficiently deliver SI to a variety of devices are desired.

SUMMARY

The described techniques relate to improved methods, systems, devices, or apparatuses that support delivery of system information (SI). A transmitting node in a wireless communications system may determine different sets of SI corresponding to different sets of devices that might receive SI from the transmitting node (target devices). The different sets of SI may each be sufficient for a different set of target devices to access a network using a particular set of resources. The transmitting node may use directional transmissions to transmit the different resource-specific sets of SI in different directions. In this way, the transmitting node may transmit towards a given set of target devices only a set of SI that is applicable to those target devices, and not other inapplicable sets of SI. This may conserve resources that would otherwise be required to also transmit the inapplicable SI in the same direction.

As another example, a transmitting node may subdivide a set of SI into two or more portions, and may transmit some portions as part of one or more reference signals, and other portions as part of a shared data channel. For example, one portion may include information utilized by all target devices, including target devices for which connection latency is relatively less tolerable than for other target devices. Another portion may include information that is specific to a set of target devices for which connection latency is less of a concern, and less frequent transmissions of such data may conserve system and device resources. Portions of SI that are common or transmitted more often may be transmitted as part of one or more reference signals, such as synchronization signals, while other portions of SI may be transmitted on a scheduled data channel, which may be accessible based on information carried by an associated control channel. Transmitting some aspects of SI as part of one or more reference signals, such as synchronization signals, and other aspects of SI on scheduled data channels may allow for elimination of other broadcast channels or free up those broadcast channels or associated resources for other information.

A method for wireless communication is described. The method may include determining a first set of resource-specific SI that is sufficient for a first set of target wireless devices to access a wireless communications network using a first set of resources and determining a second set of resource-specific SI that is sufficient for a second set of target wireless devices to access the wireless communications network using a second set of resources, where the wireless devices of the second set of target wireless devices are capable of accessing the wireless communications network using the first set of resources based at least in part on the first set of resource-specific SI and capable of accessing the wireless communications network using the second set of resources based at least in part on the second set of resource-specific SI. The method may include directionally transmitting the first set of resource-specific SI towards the first set of target wireless devices via a first transmission that excludes the second set of resource-specific SI and directionally transmitting the second set of resource-specific SI towards the second set of target wireless devices via a second transmission that excludes the first set of resource-specific SI.

An apparatus for wireless communication is described. The apparatus may include means for determining a first set of resource-specific SI that is sufficient for a first set of target wireless devices to access a wireless communications network using a first set of resources and means for determining a second set of resource-specific SI that is sufficient for a second set of target wireless devices to access the wireless communications network using a second set of resources, where the wireless devices of the second set of target wireless devices are capable of accessing the wireless communications network using the first set of resources based at least in part on the first set of resource-specific SI and capable of accessing the wireless communications network using the second set of resources based at least in part on the second set of resource-specific SI. The apparatus may include means for directionally transmitting the first set of resource-specific SI towards the first set of target wireless devices via a first transmission that excludes the second set of resource-specific SI and means for directionally transmitting the second set of resource-specific SI towards the second set of target wireless devices via a second transmission that excludes the first set of resource-specific SI.

Another apparatus for wireless communication is described. The apparatus may include a processor, memory in electronic communication with the processor, and instructions stored in the memory. The instructions may be operable to cause the processor to determine a first set of resource-specific SI that is sufficient for a first set of target wireless devices to access a wireless communications network using a first set of resources and determine a second set of resource-specific SI that is sufficient for a second set of target wireless devices to access the wireless communications network using a second set of resources, where the wireless devices of the second set of target wireless devices are capable of accessing the wireless communications network using the first set of resources based at least in part on the first set of resource-specific SI and capable of accessing the wireless communications network using the second set of resources based at least in part on the second set of resource-specific SI. The instructions may be operable to cause the processor to directionally transmit the first set of resource-specific SI towards the first set of target wireless devices via a first transmission that excludes the second set of resource-specific SI and directionally transmit the second set of resource-specific SI towards the second set of target wireless devices via a second transmission that excludes the first set of resource-specific SI.

A non-transitory computer readable medium for wireless communication is described. The non-transitory computer-readable medium may include instructions operable to cause a processor to determine a first set of resource-specific SI that is sufficient for a first set of target wireless devices to access a wireless communications network using a first set of resources and determine a second set of resource-specific SI that is sufficient for a second set of target wireless devices to access the wireless communications network using a second set of resources, where the wireless devices of the second set of target wireless devices are capable of accessing the wireless communications network using the first set of resources based at least in part on the first set of resource-specific SI and capable of accessing the wireless communications network using the second set of resources based at least in part on the second set of resource-specific SI. The non-transitory computer-readable medium may include instructions operable to cause a processor to directionally transmit the first set of resource-specific SI towards the first set of target wireless devices via a first transmission that excludes the second set of resource-specific SI and directionally transmit the second set of resource-specific SI towards the second set of target wireless devices via a second transmission that excludes the first set of resource-specific SI.

Some examples of the method, apparatus, and non-transitory computer-readable medium described above may further include processes, features, means, or instructions for transmitting the first set of resource-specific SI using a time, frequency, code, spectrum, or spatial resource specific to the first set of target wireless devices, and for transmitting the second set of resource-specific SI using a time, frequency, code, spectrum, or spatial resource specific to the second set of target wireless devices. In some examples of the method, apparatus, and non-transitory computer-readable medium described above, the first set of resource-specific SI comprises a first set of beamforming parameters, and the second set of resource-specific SI comprises a second set of beamforming parameters. In some examples, the respective transmission resources each comprise multiple sets of related transmission resources.

Some examples of the method, apparatus, and non-transitory computer-readable medium described above may further include processes, features, means, or instructions for transmitting a first portion of the second set of resource-specific SI as part of a non-scheduled channel, and transmitting a second portion of the second set of resource-specific SI as part of a scheduled channel, the scheduled channel having an associated control channel. In some examples, the first portion comprises master information block (MIB) data and the second portion comprises remaining minimum system information (RMSI) data. In some examples, the first portion comprises data that is common across the first set of resource-specific SI and the second set of resource-specific SI. Also, in some examples the first portion comprises MIB data and the second portion comprises RMSI data.

In some examples of the method, apparatus, and non-transitory computer-readable medium described above, the SI comprises MIB data, system information block (SIB) data, minimum system information block (MSIB) data, RMSI data, or any combination thereof. In some examples, the SI comprises random access channel (RACH) parameters. In some examples, the RACH parameters comprise time resource configurations, frequency resource configurations, numerology configurations, preamble configurations, power control configurations, or any combination thereof.

In some examples of the method, apparatus, and non-transitory computer-readable medium described above, the first set of resource-specific SI comprises an identification of suitability for the first set of target wireless devices, and the second set of resource-specific SI comprises an identification of suitability for the second set of target wireless devices. In some examples, the first set of target wireless devices comprises devices having a first location relative to a transmitter and the second set of target wireless devices comprises devices having a second location relative to the transmitter. The first location relative to the transmitter may comprise a first set of azimuth and elevation coordinates and the second location relative to the transmitter may comprise a second set of azimuth and elevation coordinates. In some examples, the first set of target wireless devices comprises devices of a first device type and the second set of target wireless devices comprises devices of a second device type. The first set of target wireless devices may comprise user equipments (UEs) and the second set of target wireless devices may comprise base stations, base station relays, or a combination thereof. In some examples, the first set of target wireless devices comprises devices in a first geographical area and the second set of target wireless devices comprises devices in a second geographical area. In some examples, the first set of target wireless devices comprises devices having a first set of capabilities and the second set of target wireless devices comprises devices having a second set of capabilities. A set of capabilities may comprise beam correspondence capabilities, transmission power capabilities, radio frequency capabilities, digital processing capabilities, spatial division multiplexing capabilities, or any combination thereof. In some examples, the first set of target wireless devices comprises devices having a first set of network privileges and the second set of target wireless devices comprises devices having a second set of network privileges.

A method for wireless communication is described. The method may include determining a set of SI, the SI sufficient for a wireless device to access a wireless communications network, transmitting a first portion of the set of SI, as part of one or more reference signals, according to a first periodic schedule having a first period, and transmitting a second portion of the set of SI, as part of a scheduled data channel, according to a second periodic schedule having a second period, wherein the scheduled data channel is associated with a corresponding control channel comprising information regarding the scheduled data channel.

An apparatus for wireless communication is described. The apparatus may include means for determining a set of SI, the SI sufficient for a wireless device to access a wireless communications network, transmitting a first portion of the set of SI, as part of one or more reference signals, according to a first periodic schedule having a first period, and transmitting a second portion of the set of SI, as part of a scheduled data channel, according to a second periodic schedule having a second period, wherein the scheduled data channel is associated with a corresponding control channel comprising information regarding the scheduled data channel.

Another apparatus for wireless communication is described. The apparatus may include a processor, memory in electronic communication with the processor, and instructions stored in the memory. The instructions may be operable to cause the processor to determine a set of SI, the SI sufficient for a wireless device to access a wireless communications network, transmit a first portion of the set of SI, as part of one or more reference signals, according to a first periodic schedule having a first period, and transmit a second portion of the set of SI, as part of a scheduled data channel, according to a second periodic schedule having a second period, wherein the scheduled data channel is associated with a corresponding control channel comprising information regarding the scheduled data channel.

A non-transitory computer readable medium for wireless communication is described. The non-transitory computer-readable medium may include instructions operable to cause a processor to determine a set of SI, the SI sufficient for a wireless device to access a wireless communications network, transmit a first portion of the set of SI, as part of one or more reference signals, according to a first periodic schedule having a first period, and transmit a second portion of the set of SI, as part of a scheduled data channel, according to a second periodic schedule having a second period, wherein the scheduled data channel is associated with a corresponding control channel comprising information regarding the scheduled data channel.

Some examples of the method, apparatus, and non-transitory computer-readable medium described above may further include processes, features, means, or instructions for transmitting the first portion of the set of SI as part of a primary synchronization signal (PSS), a secondary synchronization signal (SSS), a tertiary synchronization signal (TSS), a beam reference signal, or any combination thereof. In some examples, transmitting the first portion of the set of SI, as part of one or more reference signals, comprises transmitting information about the corresponding control channel. In some examples, transmitting the first portion of the set of SI, as part of one or more reference signals, comprises transmitting the one or more reference signals using a set of reference signal transmission resources indicative of a set of control channel transmission resources used to transmit the corresponding control channel. In some examples, transmitting the first portion of the set of SI, as part of one or more reference signals, comprises transmitting the one or more reference signals using a reference signal configuration indicative of a control channel configuration used for the corresponding control channel. The control channel configuration may comprise a configuration of modulation and coding scheme (MCS) parameters, numerology parameters, transmission layer parameters, port parameters, demodulation reference signal parameters, or any combination thereof.

In some examples of the method, apparatus, and non-transitory computer-readable medium described above, the second period is greater than the first period. In some examples, the first periodic schedule comprises a first schedule of directional transmissions that specifies multiple directional transmissions within the first period, and the second periodic schedule comprises a second schedule of directional transmissions that specifies multiple directional transmissions within the second period. In some examples, the scheduled data channel comprises a physical downlink shared channel (PDSCH), and the corresponding control channel comprises a physical downlink control channel (PDCCH).

Some examples of the method, apparatus, and non-transitory computer-readable medium described above may further include processes, features, means, or instructions for transmitting the corresponding control channel according to a third schedule comprising a fixed temporal offset relative to the first periodic schedule. In some examples, transmitting the corresponding control channel according to the third schedule comprising the fixed temporal offset relative to the first periodic schedule comprises transmitting the corresponding control channel within a temporal window, the temporal window spanning a set duration of time and beginning at a time based at least in part on the fixed temporal offset.

In some examples of the method, apparatus, and non-transitory computer-readable medium described above, determining the set of SI comprises determining MIB data, RMSI data, or any combination thereof. In some examples, determining the set of SI further comprises determining one or more RACH parameters. The RACH parameters may comprise time resource configurations, frequency resource configurations, numerology configurations, preamble configurations, power control configurations, or any combination thereof.

In some examples of the method, apparatus, and non-transitory computer-readable medium described above, the first portion of the set of SI comprises index information regarding a PSS, index information regarding a SSS, information regarding a transmission resource used to transmit the one or more reference signals, information regarding a transmission resource used to transmit the second portion of the set of SI, information regarding a numerology for the corresponding control channel, information regarding a numerology for the data channel, information regarding device privileges for the network, information regarding the first periodic schedule, information regarding the second periodic schedule, beam-related information, a subset of MIB data, a subset of RMSI data, or any combination thereof.

Some examples of the method, apparatus, and non-transitory computer-readable medium described above may further include processes, features, means, or instructions for transmitting the first portion of the set of SI using a first set of transmission resources, and transmitting the second portion of the set of SI using a second set of transmission resources, wherein the first set of transmission resources and the second set of transmission resources are multiplexed within one or more transmission resource domains.

A method for wireless communication is described. The method may include receiving a first portion of a set of SI, as part of one or more reference signals, according to a first periodic schedule having a first period, receiving a second portion of the set of SI, as part of a scheduled data channel, according to a second periodic schedule having a second period, wherein the scheduled data channel is associated with a corresponding control channel comprising information regarding the scheduled data channel, and using the set of SI to access a wireless communications network.

An apparatus for wireless communication is described. The apparatus may include means for receiving a first portion of a set of SI, as part of one or more reference signals, according to a first periodic schedule having a first period, receiving a second portion of the set of SI, as part of a scheduled data channel, according to a second periodic schedule having a second period, wherein the scheduled data channel is associated with a corresponding control channel comprising information regarding the scheduled data channel, and using the set of SI to access a wireless communications network.

Another apparatus for wireless communication is described. The apparatus may include a processor, memory in electronic communication with the processor, and instructions stored in the memory. The instructions may be operable to cause the processor to receive a first portion of a set of SI, as part of one or more reference signals, according to a first periodic schedule having a first period, receive a second portion of the set of SI, as part of a scheduled data channel, according to a second periodic schedule having a second period, wherein the scheduled data channel is associated with a corresponding control channel comprising information regarding the scheduled data channel, and use the set of SI to access a wireless communications network.

A non-transitory computer readable medium for wireless communication is described. The non-transitory computer-readable medium may include instructions operable to cause a processor to receive a first portion of a set of SI, as part of one or more reference signals, according to a first periodic schedule having a first period, receive a second portion of the set of SI, as part of a scheduled data channel, according to a second periodic schedule having a second period, wherein the scheduled data channel is associated with a corresponding control channel comprising information regarding the scheduled data channel, and use the set of SI to access a wireless communications network.

Some examples of the method, apparatus, and non-transitory computer-readable medium described above may further include processes, features, means, or instructions for receiving the first portion of the set of SI as part of a PSS, a SSS, a TSS, a beam reference signal, or any combination thereof. In some examples, receiving the first portion of the set of SI, as part of one or more reference signals, comprises receiving information about the corresponding control channel. In some examples, receiving the first portion of the set of SI, as part of one or more reference signals, comprises receiving the one or more reference signals via a set of reference signal transmission resources indicative of a set of control channel transmission resources used to transmit the corresponding control channel. In some examples, the one or more reference signals have a reference signal configuration indicative of a control channel configuration used for the corresponding control channel. The control channel configuration may comprise a configuration of MCS parameters, numerology parameters, transmission layer parameters, port parameters, demodulation reference signal parameters, or any combination thereof.

In some examples of the method, apparatus, and non-transitory computer-readable medium described above, the second period is greater than the first period. In some examples, the first periodic schedule comprises a first schedule of directional transmissions that specifies multiple directional transmissions within the first period, and the second periodic schedule comprises a second schedule of directional transmissions that specifies multiple directional transmissions within the second period. In some examples, the scheduled data channel comprises a PDSCH, and the corresponding control channel comprises a PDCCH.

Some examples of the method, apparatus, and non-transitory computer-readable medium described above may further include processes, features, means, or instructions for receiving the corresponding control channel according to a third schedule comprising a fixed temporal offset relative to the first periodic schedule. In some examples, receiving the corresponding control channel according to the third schedule comprising the fixed temporal offset relative to the first periodic schedule comprises receiving the corresponding control channel within a temporal window, the temporal window spanning a set duration of time and beginning at a time based at least in part on the fixed temporal offset, and searching the temporal window for the corresponding control channel.

In some examples of the method, apparatus, and non-transitory computer-readable medium described above, the set of SI comprises MIB data, RMSI data, or any combination thereof. In some examples, the set of SI further comprises one or more RACH parameters. The RACH parameters may comprise time resource configurations, frequency resource configurations, numerology configurations, preamble configurations, power control configurations, or any combination thereof.

In some examples of the method, apparatus, and non-transitory computer-readable medium described above, the first portion of the set of SI comprises index information regarding a PSS, index information regarding a SSS, information regarding a transmission resource used to transmit the one or more reference signals, information regarding a transmission resource used to transmit the second portion of the set of SI, information regarding a numerology for the corresponding control channel, information regarding a numerology for the data channel, information regarding device privileges for the network, information regarding the first periodic schedule, information regarding the second periodic schedule, beam-related information, a subset of MIB data, a subset of RMSI data, or any combination thereof.

Some examples of the method, apparatus, and non-transitory computer-readable medium described above may further include processes, features, means, or instructions for receiving the first portion of the set of SI via a first set of transmission resources, and receiving the second portion of the set of SI via a second set of transmission resources, wherein the first set of transmission resources and the second set of transmission resources are multiplexed within one or more transmission resource domains. Some examples may further provide for receiving the one or more reference signals from a first transmitting node, and receiving the corresponding control channel from a second transmitting node. Some examples may further provide for locating the scheduled data channel by blindly testing multiple hypotheses.

DETAILED DESCRIPTION

Figure 1:
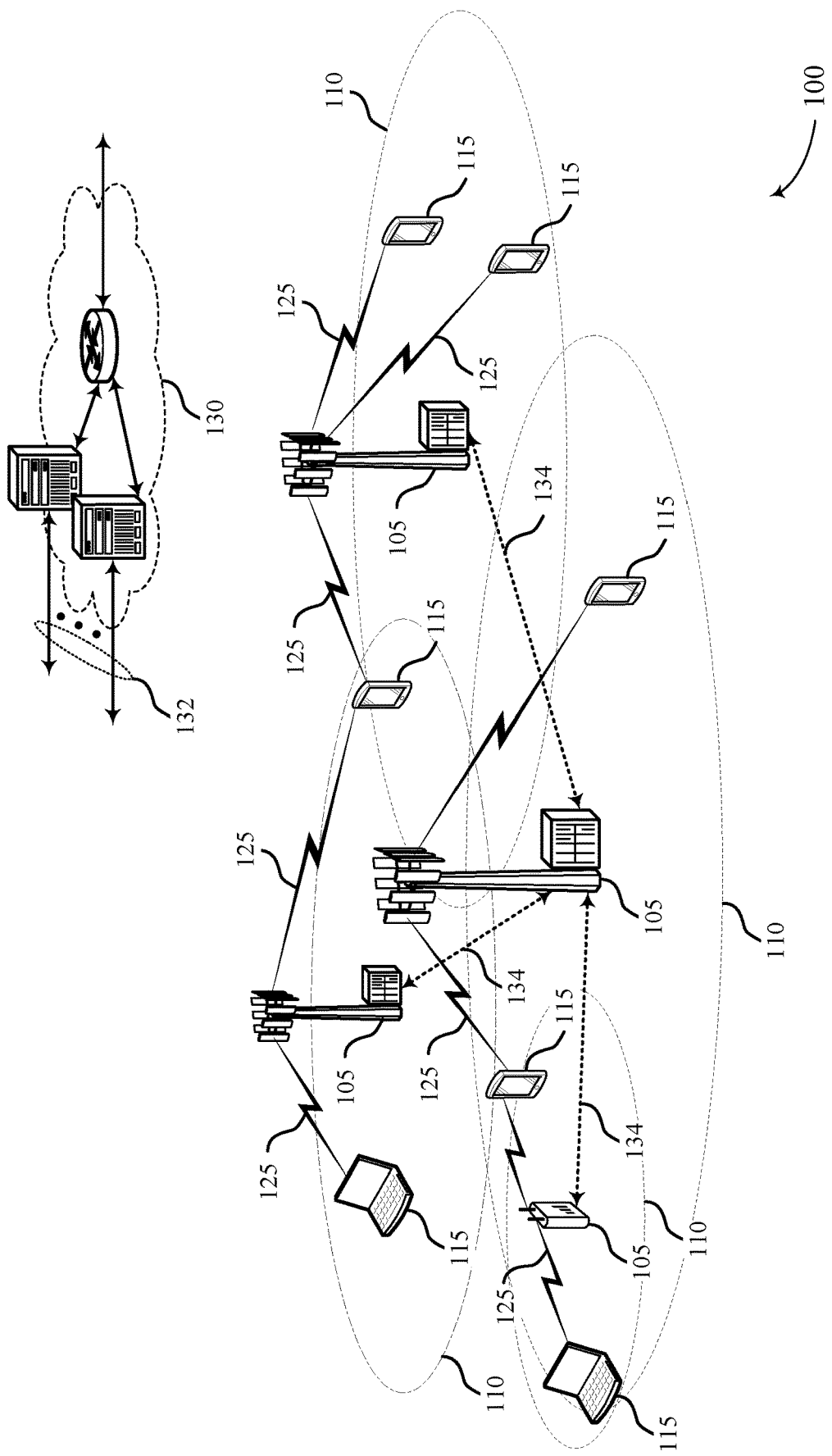
FIG. 1 illustrates an example of a system for wireless communication that supports delivery of system information in accordance with aspects of the present disclosure.

To establish communication with a network, a device such as a user equipment (UE) or base station may first receive synchronization information for a cell of the network along with other operational information about the cell. Aside from synchronization, the information necessary for a device to properly establish wireless communications within the cell may be referred to as system information (SI). Within a cell, a base station may regularly transmit SI to enable other devices that enter the cell to establish wireless communications with the base station. Target devices may differ, however, in their SI requirements as well as in the resources the target devices may use to establish wireless communications with the base station. Similarly, some aspects of SI may be required by target devices more often than other aspects of SI. Thus, transmitting all aspects of SI equally often, or in a manner just as likely to be received by a target device for which the SI is inapplicable as by a target device for which the SI is applicable may waste device and system resources such as power, time, frequency, code, spatial, or spectrum resources.

For example, some target devices may be mobile devices such as UEs, for which it may be desirable to enable the establishment of wireless communications with relatively low latency, while other target devices may be immobile devices such as other base stations, base station relays, or a combination, for which latency in establishing communications may be less of a concern. As another example, different target devices may have different capabilities—such as differing abilities to send and receive directional transmissions, different transmission power capabilities, and the like—or different network privileges, such as different privileges to camp on the network that includes the base station. As yet another example, different target devices may differ in the transmission resources the target devices are entitled to use or are capable of using. For example, one set of target devices may be entitled to or able to use a greater bandwidth or a different set of component carriers for subsequent transmissions than another set of target devices. As can be seen from these examples and the other examples described herein, which are in no way intended to be limiting, a wide variety of scenarios exist in which different configurations or sets of SI may be desirable for different target devices, and one of ordinary skill in the art will be able to appreciate any number of additional such scenarios.

From both a system perspective and a device perspective, resources may be conserved by determining different sets of SI corresponding to different sets of target devices and by transmitting each set of SI in a targeted manner, using resources specifically selected to reach the target devices for which the SI is useful (as opposed to, e.g., broadcasting all SI at all times and in a manner equally likely to reach any one target device as another). Similarly, resources may be conserved by transmitting some aspects of SI—either across sets of SI or within a single set of SI—as part of reference signals. Thus, the various wireless communications systems and methods described herein may be used to efficiently deliver and receive SI and thereby save resources such as power, time, frequency, code, spatial, or spectrum resources. Further, while the examples provided herein are generally described from the perspective of a base station transmitting SI, the described techniques may be implemented to similar benefit at any wirelessly transmitting node, including, for example, a UE that supports peer-to-peer (P2P) or device-to-device (D2D) communications.

As one example, a transmitting node may determine different sets of SI, each sufficient for a different set of target devices to access a network using a particular set of resources, and utilize directional transmissions, which may also be referred to as beamforming transmissions, to transmit the different resource-specific sets of SI in different directions. In this way, the transmitting node may transmit towards a given set of target devices a set of SI that is applicable to those target devices, and not other inapplicable sets of SI. This may conserve resources that would otherwise be required to also transmit the inapplicable SI in the same direction as the applicable SI. Likewise, the transmitting node may use one or more transmission resources—such as one or more time, frequency, code, power, spectrum, or spatial resources—to transmit only one set of SI that is specific to one set of target devices, and may use other transmission resources to transmit other sets of SI, similarly conserving resources.

As another example, a transmitting node may subdivide a set of SI into two or more portions, and may transmit some portions as part of one or more reference signals, such as synchronization signals, while remaining SI transmitted less often is transmitted on scheduled data channels, for example, on data channels having associated control channels. This may eliminate the need for one or more broadcast channels (or unscheduled channels) that may otherwise be used to transmit the portion of the SI transmitted as part of one or more reference signals, or free those broadcast channels to carry other information. This may also enable a portion of a set of SI to be transmitted more often than the remainder. For example, one portion may include information utilized by all target devices, including target devices for which connection latency is relatively less tolerable than for other target devices. Another portion may include information that is specific to a set of target devices for which connection latency is less of a concern, and where less frequent transmissions of such data may conserve system and device resources. In some cases, the different schedules according to which different portions of SI are transmitted may include repeated directional transmissions in different directions, a technique which may be referred to as beam-sweeping.

Aspects of the disclosure are initially described in the context of wireless communications systems. Further examples are then provided that illustrate a variety of transmission schemes for the efficient delivery of SI, along with corresponding receiver-side systems and methods. Aspects of the disclosure are further illustrated by and described with reference to apparatus diagrams, system diagrams, and flowcharts that relate to delivery of SI.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communications with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band, since the wavelengths range from approximately one millimeter to one centimeter in length. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be colocated at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communications between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA), absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or discrete Fourier transform-spread-OFDM (DFT-S-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communications with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

To establish communications with a wireless communications system, such as wireless communications system 100, a device such as a UE 115 or base station 105 may first need to receive SI for an existing cell within the network. SI may comprise any information, other than synchronization information, that is necessary for a device necessary to properly establish communications within the cell. Thus, a base station within the cell may transmit SI on a periodic basis, or alternatively transmit a minimum amount of SI on a periodic basis and a remaining amount of SI on an on-demand basis or on a periodic basis with sparser, less frequent periodicity.

Synchronization information may be transmitted as part of a primary synchronization signal (PSS). A PSS may be a sequence transmitted within a cell by a base station 105 on a periodic basis and may allow a target device to achieve synchronization at a slot or TTI level of granularity. A PSS may also include some information regarding the cell's identity (e.g., the cell's identity within a larger group of cell identities, thus reducing the number of possible identities for the cell), along with information that may enable the target device to locate and receive a secondary synchronization signal (SSS). In some cases, the PSS may be based on Zadoff-Chu (ZC) sequences or m-sequences.

The base station 105 may also transmit the SSS on a periodic basis, and it may allow a target device to achieve synchronization at a less granular temporal level, such as at a frame level. In some cases, the base station may transmit multiple SSSs (e.g., two SSSs) within a single frame according to a pattern such that, from receiving a single SSS and identifying its place in the pattern, the target device may determine frame timing. An SSS sequence may be based on maximum length sequences, known as M-sequences, and may be constructed by interleaving, in the frequency-domain, two length-31 Binary Phase Shift Keying (BPSK)-modulated sequences. The two underlying length-31 sequences may themselves be two different cyclic shifts of a single length-31 M-sequence. The cyclic shift indices of the M-sequences may be derived from a function of a physical layer cell identity group that includes the cell's identity. Thus, the target device may be able to derive the applicable cell identity group from the SSS and, combined with the identity information that the target device may have obtained from the PSS, thereby determine the cell's complete cell identity.

In addition to any SI that may be included in a PSS or SSS transmissions, a base station 105 may transmit other SI on a periodic or on-demand basis. In some cases, the base station 105 may broadcast SI on a physical broadcast channel (PBCH). The SI broadcast on a PBCH may include a first block of SI referred to as the master information block (MIB) along with one or more additional blocks of SI referred to as system information blocks (SIBs).

A MIB may include a limited number of SI parameters that are essential for a target device's initial access to the network, and thus MIB data may be transmitted relatively more frequently than certain other SI data. For example, a MIB may include data regarding downlink system bandwidth (e.g., in terms of RBs), where the resources may be allocated to HARQ acknowledgement signaling in the downlink (e.g., configuration data for a physical HARQ indicator channel (PHICH)), as well as a SFN. In some cases, each repetition of a MIB may be scrambled with a different scrambling code, according to some pattern, and the target device may try to decode a received MIB with different phases of a scrambling code until obtaining a successful CRC—based at least in part on the phase that yields a successful CRC check, the target device may be able to identify which repetition of the MIB it received and thereby determine the current SFN by reading the SFN decoded form the MIB and adding the scrambling code-derived phase.

Along with the MIB, a base station 105 may transmit one or more SIBs. The base station 105 may transmit one or more SIBs on a periodic basis and or on an on-demand basis. Different SIBs may be defined according to the type of SI conveyed, with each SIB comprising a set of functionally-related parameters. Different SIBs may be identified according to a numbering scheme. As an example, SIB1 may comprise parameters to enable a target device to determine if the cell is suitable for cell selection by the target device, as well as information about the time domain scheduling of other SIBs. SIB1 may be periodically transmitted more often than other SIBs and may include access information, including cell identity information, and may indicate whether a target device is allowed to camp on a cell. SIB1 may also include cell selection information (or cell selection parameters). Additionally, SIB1 may include scheduling information for other SIBs.

For example, SIB2 may be transmitted periodically or scheduled dynamically, with SIB1 providing information regarding the timing and resources used for the transmission of SIB2. SIB 2 may include access information for the cell such as information about the uplink cell bandwidth, random-access parameters (as described in greater detail below), and parameters related to uplink power control. SIB2 may also include parameters related to various common and shared communications channels. Other SIBs may include other parameters related, e.g., to intra-frequency, inter-frequency and inter-radio access technology (RAT) cell reselection, emergency notification information, restrictions on device access to the cell, sidelink connectivity, and the like.

In some wireless communications systems, such as NR or 5G communications systems, MIB, SIB1, and SIB2 data may be combined to form a minimum system information block (MSIB). The MSIB data may be further subdivided, with one portion of the MSIB data sent as part of one transmission, and the remainder of the MSIB data, which may be referred to as the remaining MSI (RMSI), may sent as part of a second transmission. For example, in some cases a base station may transmit a first MSIB portion including MIB data and later transmit the RMSI (including, e.g., SIB1 and SIB2 data). Data corresponding to SIBs other than SIB1 or SIB2 may be transmitted as part of other information blocks, each of which may be referred to as an other system information block (OSIB), where OSIBs may be transmitted on a periodic or on-demand basis.

Following cell synchronization, a target device may decode the MIB, SIB1 and SIB2 (or MSIB) prior to accessing the network. The target device may access the network via a random access channel (RACH) through a process which may be referred to as a RACH process. The RACH may be a transport channel used for access to the network when the target device does not yet have accurate uplink timing synchronization, or when the target device does not yet have any allocated uplink transmission resource. The RACH may be contention-based, and may be carried by a Physical Random Access Channel (PRACH). In some cases, the PRACH may consist of a preamble signature, which is either randomly selected or pre-assigned.

After decoding SIB2 (or RMSI), a target device may transmit a RACH preamble to the base station 105, which may be referred to as RACH message 1. For example, the RACH preamble may be randomly selected from a set of predetermined sequences. This may enable the base station 105 to distinguish between multiple target devices trying to access the system simultaneously. The base station 105 may respond with a random access response (RAR), which may also be known as RACH message 2, that provides to the target device an uplink (UL) resource grant, a timing advance and a temporary cell radio network temporary identity (C-RNTI). The target device may then transmit a RRC connection request, which may also be known as RACH message 3, along with a temporary mobile subscriber identity (TMSI) (if the target device has previously been connected to the same wireless network) or a random identifier, which may be a random mobile subscriber identity. The RRC connection request may also indicate the reason the target device is connecting to the network (e.g., emergency, signaling, data exchange, etc.). The base station 105 may respond to the connection request with a contention resolution message, which may also be referred to as RACH message 4, addressed to the target device, which may provide a new C-RNTI. If the target device receives a contention resolution message with the correct identification, it may proceed with RRC setup. If the target device does not receive a contention resolution message (e.g., if there is a conflict with another target device due to overlapping transmission of identical RACH message 1s), the target device may repeat the RACH process by transmitting a new RACH preamble (RACH message 1).

A base station may periodically transmit a variety of parameters to enable a target device to properly initiate and complete a RACH processes, including, for example, parameters related to the time and frequency resources available for RACH, a numerology of slots or TTIs available for RACH, the RACH preambles that are allowed, and/or power control for RACH signaling. These may be referred to as RACH parameters, and a base station may transmit them as part of SIB2 (or RMSI).

Figure 2:
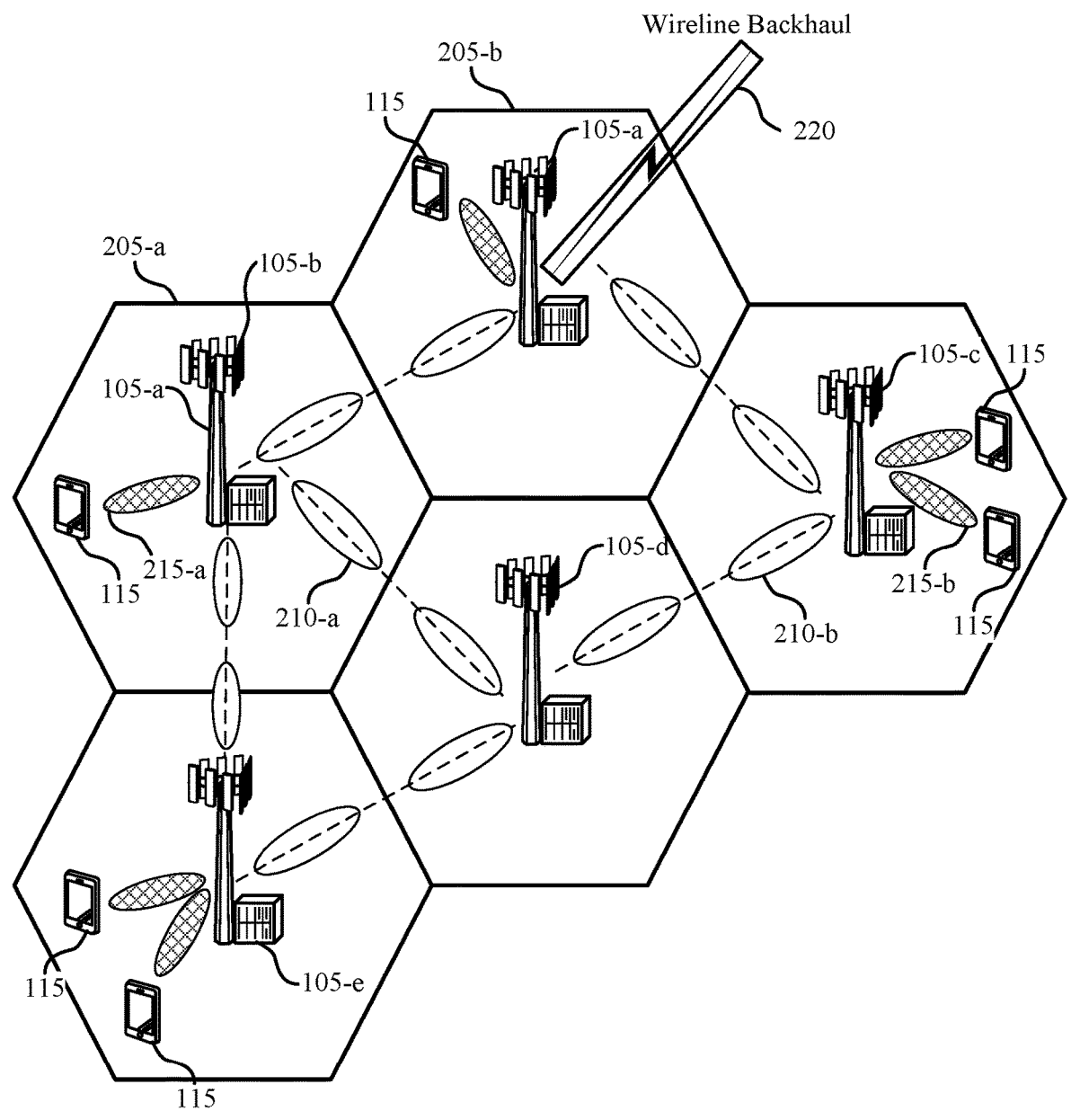
FIG. 2 illustrates an example of a system for wireless communications that supports delivery of system information in accordance with aspects of the present disclosure.

FIG. 2 illustrates an example of a wireless communications system 200 that supports delivery of SI in accordance with aspects of the present disclosure. In some examples, wireless communications system 200 may implement aspects of wireless communications system 100. As described above, many scenarios exist in which different sets of SI—e.g., MIBs/SIBs or MSIBs with different parameter configurations—may be suitable for different sets of target devices, and it may be desirable to efficiently transmit the different sets of SI to the respectively corresponding sets of target devices. FIG. 2 illustrates one such scenario.

Wireless communications system 200 may include a number of base stations 105 and UEs 115. The base stations 105 may be configured so as to form a plurality of mesh networks 205, and the base stations 105 may communicate with other base stations 105 via wireless links 210. The base stations may also communicate with UEs 115 via direct wireless links 215. Wireless communications system 200 may include wireline backhaul link 220, which is connected to only a subset of the base stations 105, which in this case is base station 105-a. Wireline backhaul link 220 may be a high capacity fiber backhaul connection to a core network.

Wireless links 210, 215 may be directional communications (e.g., mmW transmissions). Wireless communications system 200 may use directional transmissions to support, for example, access traffic between a base station 105 and a UE 115 as well as backhaul traffic between base stations 105. Wireless communications system 200 may be a relatively dense deployments of base stations 105 and may provide only a subset of the base stations—in this example, only base station 105-a—with a wireline backhaul link 220, and other base stations 105 may rely on wireless links 210 for backhaul functionalities, a configuration which may be referred to as self-backhauling or integrated access/backhaul (IAB). Self-backhauling or IAB may share wireless resources between access traffic and backhaul traffic, and may have benefits of enhancing wireless link capacity, reducing latency, reducing the cost of cell deployment, or any combination thereof. In systems with mmW base station deployments, IAB may use relatively narrow beams, which may be referred to as pencil beams, for wireless backhaul links between base stations which can help reduce inter-link interference with one or more other directional communications links in the system.

In wireless communications system 200, a base station 105 may transmit SI to enable UEs 115 to establish communications and also transmit SI to enable other base stations to establish communications with base station 105. A base station 105 may transmit different sets of SI for use by UEs 115 than for use by other base stations 105. For example, a base station 105 may transmit a first set of SI that is sufficient for UEs 115 to establish wireless links 215 using a first set of resources (e.g., time resources, frequency resources, code resources, spatial resources, etc.) and transmit a second set of SI that is sufficient for base stations 105 to establish wireless links 210 using a second set of resources. Thus, a base station 105 may determine different sets of resource-specific SI (e.g., MIBs/SIBs or MSIBs with different parameter configurations), with each set of resource-specific SI corresponding to a different set of target devices (e.g., UEs 115 versus base stations 105). For example, different sets of resource-specific SI may include different beamforming-related parameters, as the different sets of target devices may lie in different directions relative to the transmitting node. Different sets of target devices may in some cases have different capabilities, and some sets of target devices may be capable of accessing wireless communications system 200 using resource-specific SI intended for other target devices (if opportunistically received), and some sets of target devices may not have such capability and resource-specific SI intended for other devices may be insufficient for such target devices to access wireless communications system 200 (even if opportunistically received). For example, the base stations 105 may be capable of establishing wireless links 210 using the first set of resources and capable of establishing wireless links 210 using the second set of resources. In some cases, the first set of SI—which may be intended for UEs 115—may be sufficient for base stations 105 to access wireless communications system 200 using the first set of resources if base stations 105 opportunistically receive the first set of SI. In some cases, the second set of SI—which may be intended for base stations 105—may be insufficient for UEs 115 to access wireless communications system 200 using the second set of resources, even if UEs 115 opportunistically receive the second set of SI.

In some examples, instead of transmitting the same SI in all directions (or determining different sets of resource-specific SI but transmitting each set of resource-specific SI in all directions), a base station 105 may determine different sets of resource-specific SI and transmit in a given direction only the set(s) of resource-specific SI that are applicable to target devices in that direction. For example, in a direction that is aimed towards other base stations 105 but not UEs 115, a base station 105 may transmit only a set of resource-specific SI that is useful for base stations 105; conversely, in a direction that is aimed towards only UEs 115, a base station 105 may transmit only a different set of resource-specific SI that is useful for UEs 115. Thus, transmitting device resources, receiving device resources, and system resources may be conserved by avoiding the transmission in a given direction of any SI that is not useful for target devices in that direction. In some cases, instead of or in addition to using directional transmissions, a base station 105 may transmit sets of resource-specific SI using one or more other types of transmission resources—e.g., time, frequency, code, spectrum, or spatial resources—specific to a corresponding set of target devices.

Wireless communications system 200 is an example in the context of self-backhauling networks, but as described above, one of ordinary skill will appreciate that the teachings herein regarding sets of resource-specific SI and targeted directional transmissions of the same may be applied to conserve device and system resources in any number of other scenarios. For example, a base station 105 may be located such that a relatively high density of UEs exists in one direction (e.g., a subway station exit, busy highway, crowded office building, sports venue, etc.) and a relatively low density of UEs exists in another direction, and it may be desirable to make a more robust set of resources available to the UEs in the crowded direction than to the UEs in the sparse direction. In such a scenario, a set of resource-specific SI corresponding to the more robust set of resources may be transmitted in the crowded direction and a different set of resource-specific SI corresponding to the less robust set of resources may be transmitted in the sparse direction. As another example, sets of resource-specific SI may also be determined that comprise different beam-related parameters and enable communications using different beam configurations, and the resulting sets of resource-specific SI may be transmitted only in the directions where such beam configurations will be useful to a target device. As yet another example, scenarios may arise in which target devices in one direction have different capabilities (e.g., different beam correspondence, reception or transmission power, radio frequency (RF), and digital processing, or subscription-related capabilities, etc.) or different network privileges (e.g., the ability to camp), and corresponding sets of resource-specific SI may be determined and transmitted only in useful directions. Further, scenarios may arise in which a UE 115 operating in a P2P or D2D network could utilize the same techniques described herein to deliver SI to target devices. Different sets of resource-specific SI may also include indications of the target devices for which they are intended—for example, a first set of resource-specific SI may be for UEs, and a second set of resource-specific SI may be for base stations 105, base station relays, or a combination, and a one bit flag indicating the intended set of target devices may be carried on a PBCH or as part of an RMSI.

Figure 3:
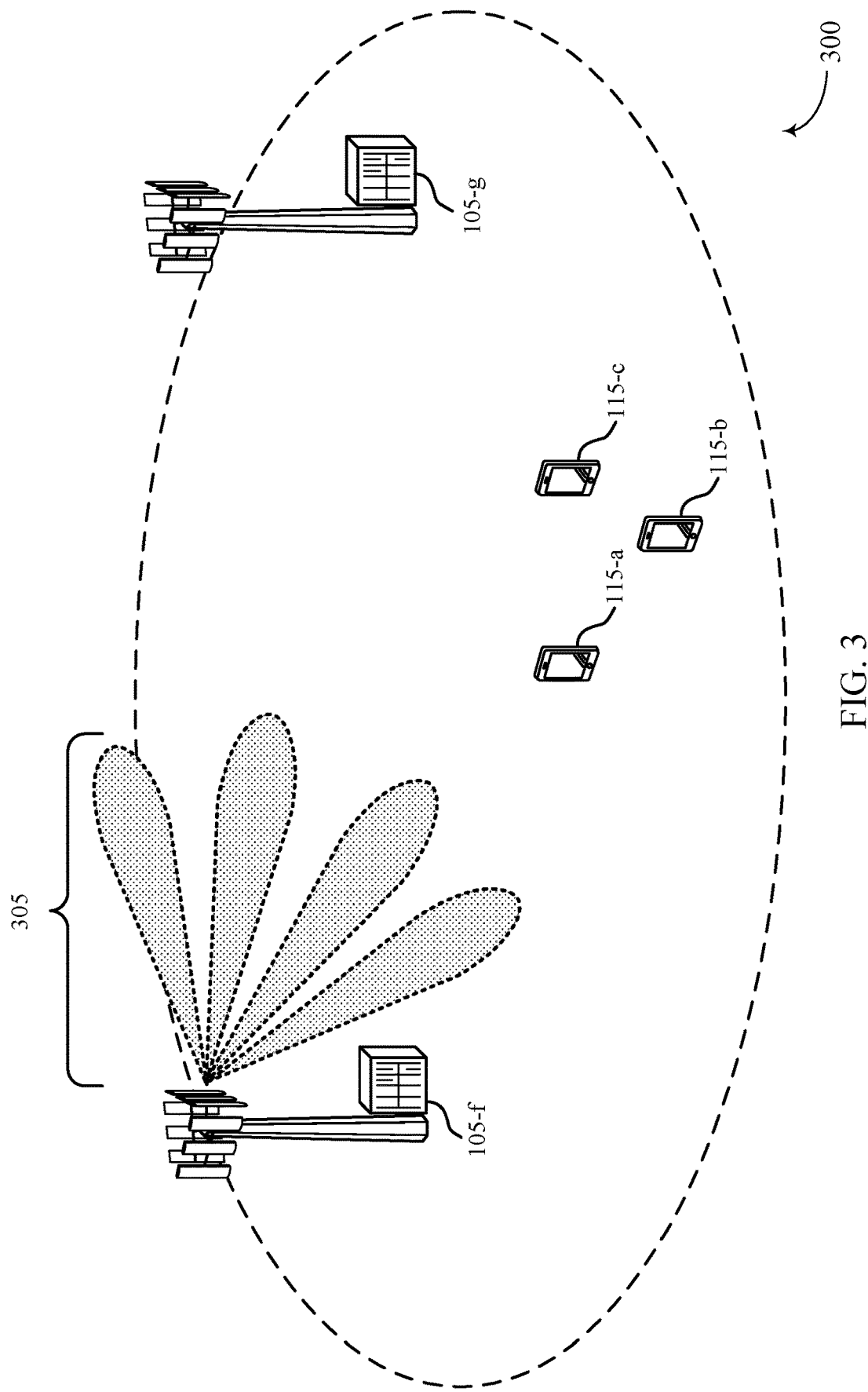
FIG. 3 illustrates an example of a system for wireless communications that supports delivery of system information in accordance with aspects of the present disclosure.

FIG. 3 illustrates a further example of a wireless communications system 300 that supports delivery of SI in accordance with aspects of the present disclosure. In some examples, wireless communications system 300 may implement aspects of wireless communications systems 100 or 200. Wireless communications system 300 comprises base station 105-*f*, base station 105-*g*, UE 115-*a*, UE 115-*b*, and UE 115-*c*. Base station 105-*f* transmits a series of directional transmissions 305, transmitting each directional transmission 305 in a different direction, a technique which may be referred to as beamsweeping. As shown in wireless communications system 300, the receive antennas for base stations 105 may be located at a higher elevation (e.g., mounted on a tower) relative to the receive antennas for UEs 115 (e.g., ground level). Thus, with a certain degree of confidence, some directional transmissions 305 may reach other base stations 105 (such as base station 105-*g*) but not UEs 115 (such as 115-*a*, UE 115-*b*, and UE 115-*c*). Similarly, other directional transmissions 305 may reach UEs 115 (such as 115-*a*, UE 115-*b*, and UE 115-*c*) but not other base stations 105 (such as base station 105-*g*).

Along with differences in elevation, differences in azimuth relative to base station 105-*f* may also allow for directional transmission of sets of resource-specific SI towards a corresponding set of target devices. For example, as described above, a busy highway may be located on one side of base station 105-*f*, and it may be known that a high density of UEs 115 are typically located in that direction. Further, in some cases, a high density of low cost or low complexity devices capable of M2M communications may be located in a particular direction relative to base station 105-*f* due to, e.g., a manufacturing or agricultural facility that lies in that direction. In some cases, instead of or in addition to using directional transmissions 305, a base station 105 may transmit sets of resource-specific SI using other transmission resources—e.g., time, frequency, code, spectrum, or spatial resources—specific to a corresponding set of target devices. Also, the transmission resources used to transmit a given set of resource-specific SI may comprise distinct sets of related transmission resources, such as, e.g., two spatial resources having related time and frequency resources, two sets of transmission resources with related beam configurations, two transmission resources that use the same antenna ports, or two transmission resources that are quasi-colocated (spatially or with respect to any other quasi-colocation parameters).

Figure 4:
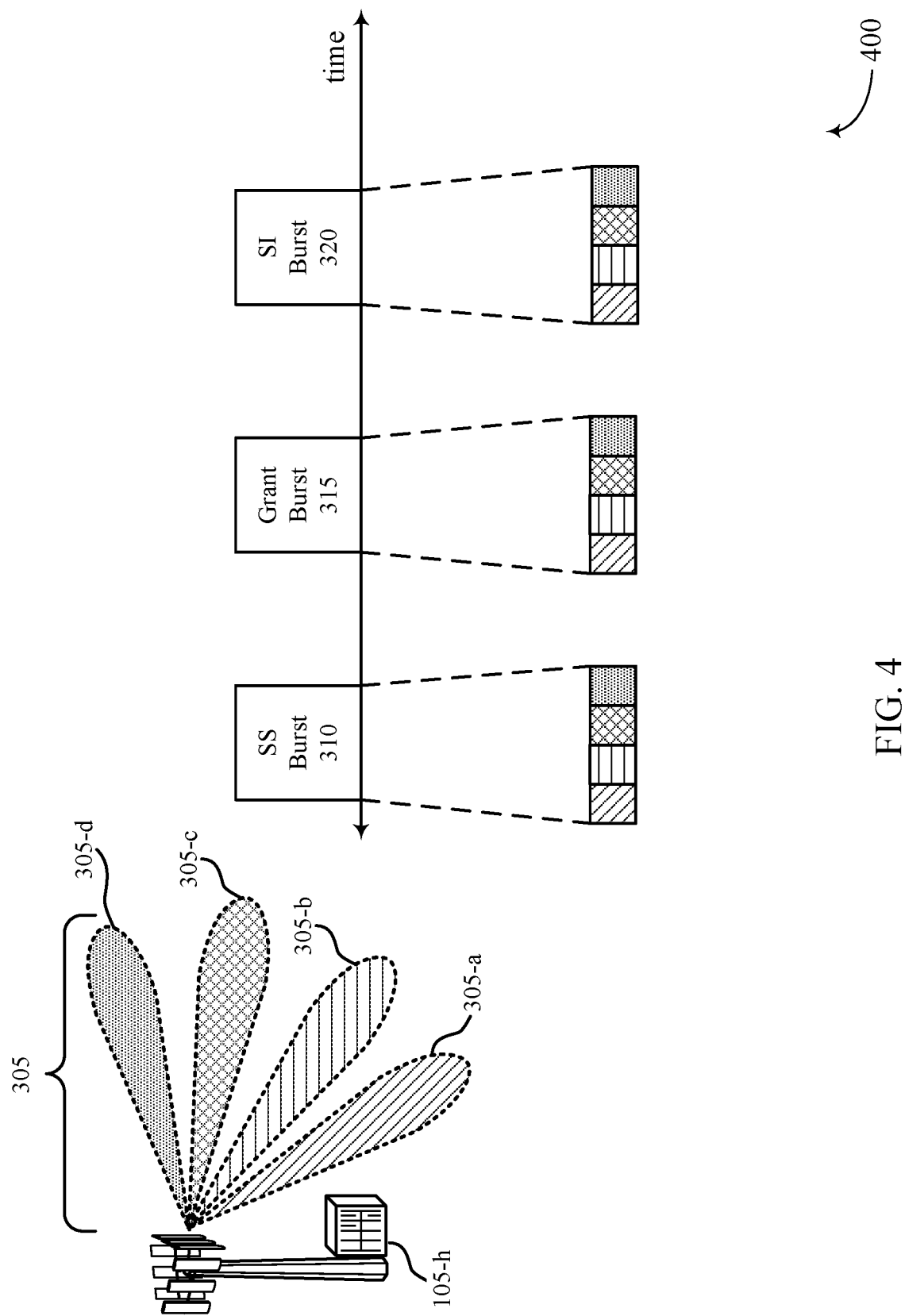
FIG. 4 illustrates an example of a transmission scheme that supports delivery of system information in accordance with aspects of the present disclosure.

FIG. 4 illustrates an example of a transmission scheme 400 that supports delivery of SI in accordance with aspects of the present disclosure. In some examples, transmission scheme 400 may be implemented by aspects of wireless communications systems 100, 200, or 300.

In transmission scheme 400, base station 105-*h* transmits a series of directional transmissions 305. Each directional transmission 305 may include a different set of SI, such as resource-specific SI, and may be directed towards a different set of target devices. Further, base station 105-*h* may utilize beamsweeping and may periodically progress through each of the directional transmissions 305 at set temporal intervals. Also, base station 105-*h* may transmit different aspects of SI and SI-related data during different beamsweeps, such that different bursts of directional transmissions may include different aspects of SI and SI-related data that are part of a single set of SI or resource-specific SI.

In some cases, during a first beamsweep, base station 105-*h* may transmit synchronization data (e.g., may transmit PSS or SSS data). Base station 105-*h* may transmit the synchronization data as part of one or more reference channel (e.g., as part of a PSS or SSS) or as part of a non-scheduled channel (e.g., a PBCH). Base station 105-*h* may successively transmit synchronization data corresponding to different sets of SI in different directions by transmitting a synchronization signal (SS) 310. SS burst 310 may comprise synchronization data sent as part of one sweep of directional transmissions 305-*a*, 305-*b*, 305-*c*, and 305-*d*. For example, as part of SS burst 310, base station 105-*h* may transmit synchronization data included in a first set of SI in a first direction, then transmit synchronization data included in a second set of SI in a second direction, then transmit synchronization data included in a third set of SI in a third direction, and then transmit synchronization data included in a fourth set of SI in a fourth direction. Each directional transmission 305 in the SS burst 310 may be directed towards a different set of target devices. Each directional transmission 305 in the SS burst 310 may be referred to as a SS block.

At some later time, during a second beamsweep, base station 105-*h* may transmit a grant burst 315. Base station 105-*h* may transmit the grant burst 315 as part of a control channel (e.g., a PDCCH), and the grant burst 315 may comprise data related to an associated scheduled or shared channel, such as a data channel (e.g., a physical downlink shared channel (PDSCH)) that will carry additional SI as part of a third beamsweep. The grant burst 315 may also comprise data that enables a target device to locate or otherwise receive the additional SI—e.g., data related to the transmission resources, such as time, frequency, code, or spatial resources, that base station 105-*h* will use to send the additional SI. As with SS burst 310, base station 105-*h* may transmit grant burst 315 by first transmitting grant data related to the first set of SI in a first direction, then transmitting grant data related to the second set of SI in a second direction, then transmitting grant data related to the third set of SI in a third direction, and then transmitting grant data related to the fourth set of SI in a fourth direction. Further, each directional transmission 305 in the grant burst 310 may be directed towards the same set of target devices as the corresponding directional transmission in the SS burst 310. Each directional transmission 305 in the grant burst 315 may be referred to as a grant block.

Then, at a yet later time, during a third beamsweep, base station 105-*h* may transmit an SI burst 320. Base station 105-*h* may transmit the SI burst 320 as part of an unscheduled channel or as part of a scheduled channel (e.g., a PDSCH) associated with the control channel (e.g., a PDCCH) that may have been used to transmit the grant burst 315. The SI burst 320 may comprise any SI data not already sent, and may include any combination of MIB, SIB, MSIB, or RMSI data. As with SS burst 310 and grant burst 315, base station 105-*h* may transmit SI burst 320 by first transmitting SI data included in the first set of SI in a first direction, then transmitting SI data included in the second set of SI in a second direction, then transmitting grant data included in the third set of SI in a third direction, and then transmitting grant data included in the fourth set of SI in a fourth direction. Further, each directional transmission 305 in the SI burst 320 may be directed towards the same set of target devices as the corresponding directional transmissions in SS burst 310 and grant burst 315. Each directional transmission 305 in the SI burst 320 may be referred to as an SI block.

In some cases, base station 105-*h* may not transmit grant burst 315. In such cases, a target device may locate SI burst 320 based on information included in SS burst 310, based on information implicit in the transmission resources or configuration used for SS burst 310, based on or more preconfigured offsets (e.g., time or frequency offsets, including offset time or frequency windows that may serve as a search space for the grant data) relative to SS burst 310, or by testing one or more blind hypotheses.

Figure 5:
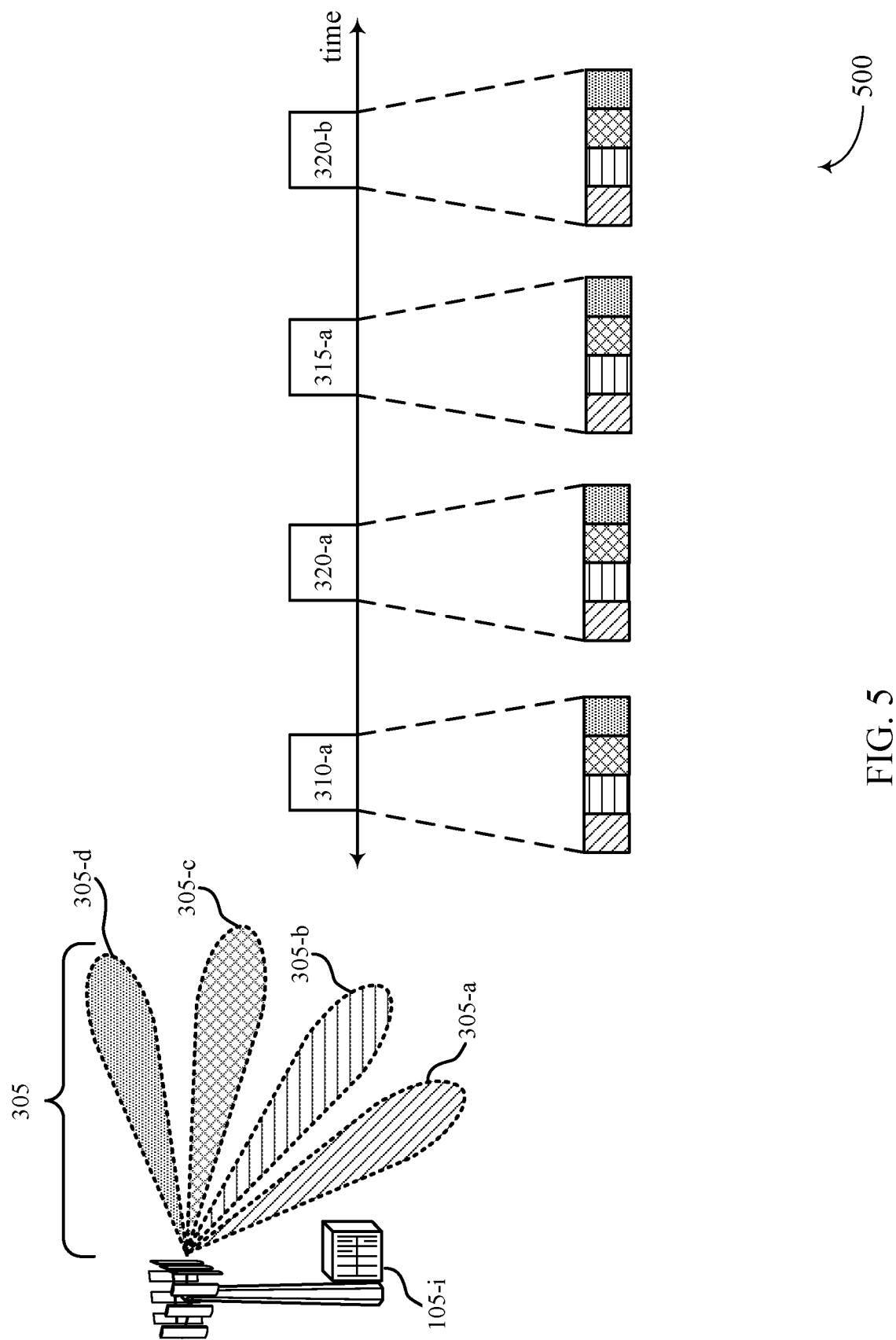
FIG. 5 illustrates an example of a transmission scheme that supports delivery of system information in accordance with aspects of the present disclosure.

FIG. 5 illustrates an additional example of a transmission scheme 500 that supports delivery of SI in accordance with aspects of the present disclosure. In some examples, transmission scheme 500 may be implemented by aspects of wireless communications systems 100, 200, or 300.

In transmission scheme 500, base station 105-*i* subdivides each set of resource-specific SI such that it transmits two SI bursts 320, with SI burst 320-*a* and SI burst 320-*b* each comprising a different portion of a set SI. For example, SI burst 320-*a* may comprise MIB, SIB, or MSIB data intended for certain sets of target devices while SI burst 320-*b* may comprise RMSI or other RACH-related data intended for those same sets of target devices. In some cases, SI burst 320-*a* may comprise SI that is common across all or multiple sets of target devices while SI burst 320-*b* may comprise SI data that is unique across on or more of those sets of target devices. For example, some or all MIB, SIB, or MSIB parameters may be common across all or multiple sets of target devices and may be included in SI burst 320-*a*, while RMSI or other RACH-related parameters may be unique to each set of target devices. In other cases, both SI burst 320-*a* and SI burst 320-*b* may comprise SI data that is unique across one or more of the corresponding sets of target devices. In some cases, base station 105-*i* may transmit a first SI burst 320-*a* on a non-scheduled or reference channel (e.g., a PBCH) and a second SI burst 320-*b* on a scheduled or shared channel, such as a data channel (e.g., a PDSCH). The channel on which base station 105-*i* transmits SI burst 320-*b* may be associated with a control channel, and thus base station 105-*i* may also transmit a grant burst 315 similar to the grant burst 315 described above in reference to transmission scheme 400 at any time prior to transmitting second SI burst 320-*b* (e.g., in between SI burst 320-*a* and SI burst 320-*b* or prior to SI burst 320-*a*). A target device may locate the second SI burst 320-*b* in any of the ways described above with reference to transmission scheme 400 and the SI burst 320 illustrated therein.

One of ordinary skill will appreciate that base station 105-*i* may subdivide a set of SI into any number of portions and transmit any number of SI bursts 320 in any order, and that the example of transmission scheme 500 should not be construed as limiting in either regard. Further, one of ordinary skill will appreciate that base station 105-*i* may transmit some or all of MIB, SIB, or MSIB data or RMSI or other RACH-related data as part of a SS burst 310 or grant burst 315.

Figure 6:
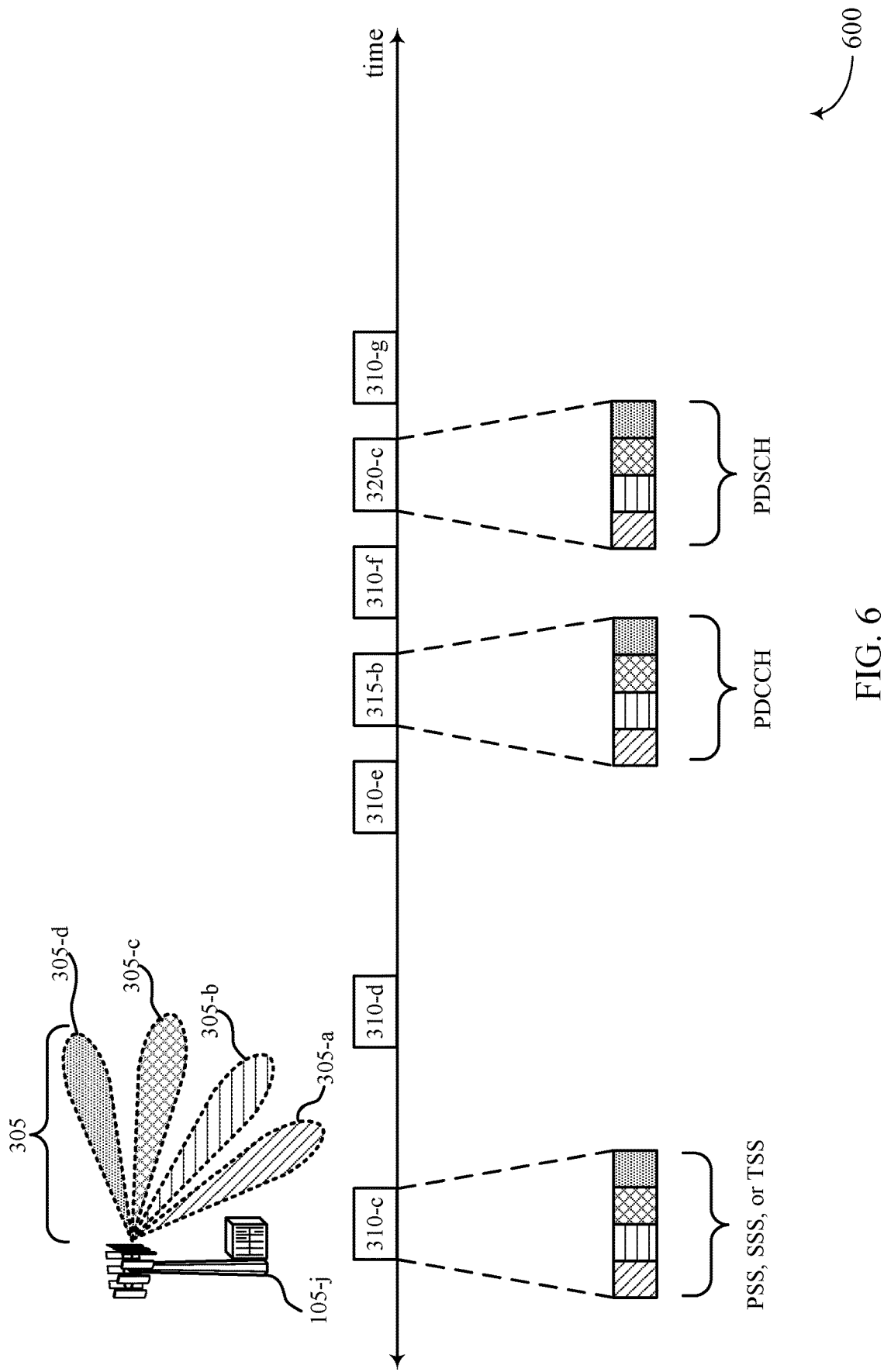
FIG. 6 illustrates an example of a transmission scheme that supports delivery of system information in accordance with aspects of the present disclosure.

FIG. 6 illustrates an additional example of a transmission scheme 600 that supports delivery of system information in accordance with aspects of the present disclosure. In some examples, transmission scheme 400 may be implemented by aspects of wireless communications systems 100, 200, or 300.

In transmission scheme 500, base station 105-*j* transmits a series of SS bursts 310 according to a periodic schedule. Base station 105-*j* also transmits SI bursts 320, but according to a different periodic schedule. The periodic schedule with which base station 105-*j* transmits SI bursts 320 may have a larger than does the schedule with which base station 105-*j* transmits SS bursts 310. Base station 105-*j* may transmit the SS bursts 310 via one or more reference signals (e.g., a PSS, an SSS, or a beam reference signal) and transmit the SI bursts 320 as part of a scheduled data channel (e.g., a PDSCH).

In some cases, base station 105-*j* may transmit grant bursts 315 as part of a control channel associated with the data channel upon which base station 105-*j* transmits SI bursts 320—e.g., base station 105-*j* may transmit grant bursts 315 on a PDCCH corresponding to the PDSCH upon which it transmits SI bursts 320. Base station 105-*j* may transmit the grant bursts 315 according to a third periodic schedule, which may also have a larger period than does the schedule with which base station 105-*j* transmits SS bursts 310. In some cases, the schedule with which base station 105-*j* transmits grant bursts 315 may have the same period as the schedule with which base station 105-*j* transmits SI bursts 320. The period with which base station 105-*j* transmits grant bursts 315 may comprise a fixed time or frequency offset relative to times at which the base station 105-*j* transmits SS bursts 310, and those temporal offsets may define a window in the time or frequency domains, such that a target device may use the window as a search space in which to locate a grant burst 315 or grant block by blindly testing hypotheses.

Base station 105-*j* may determine a set of minimum SI comprising any combination of MIB and RMSI data, which may include RACH-related parameters. Base station 105-*j* may further divide the set of minimum SI into two portions, a first portion and a second portion. Base station 105-*j* may transmit the first portion, which may, for example, be MIB data, as part of a SS burst 310. Thus, base station 105-*j* may transmit the first portion as part of a PSS, part of an SSS, or via a combination of a PSS and SSS. Base station 105-*j* may transmit the second portion, RMSI, as part of an SI burst 320.

The first portion of the set of minimum SI may comprise information to enable a target device to identify the time and frequency resources used for related reference signals. For example, the first portion of the set of minimum SI may comprise indexing information regarding the PSS and SSS signals (e.g., to enable a target device that receives an SS burst 310 or SS block within the SS burst to identify a burst index or block index). The first portion of the set of minimum SI may also include information (such as time and frequency information) that a target device may use to locate at least the control channel upon which grant bursts 315 are transmitted (and possibly also the data channel upon which SI bursts 320 are transmitted, which may eliminate the need for the grant bursts with respect to SI delivery). The first portion of the set of minimum SI may also include information regarding the schedule with which base station 105-*j* transmits grant bursts 315, such as a time or frequency window or offset information, or a burst set index of the SS burst closest to the grant burst 315). As another example, the first portion of the set of minimum SI may include numerology for the control channel upon which base station 105-*j* transmits grant bursts 315 (and possibly also the data channel upon which base station 105-*j* transmits SI bursts 320), or information about whether base station 105-*j* does or does not transmit a control channel with grant information related to the data channel upon which base station 105-*j* transmits SI bursts 320. In some cases, the first portion of the set of minimum SI may include information regarding network privileges for a target device, such as whether a target device may camp on the cell corresponding to base station 105-*j*. And as another example, the first portion of the set of minimum SI may include information about the periodicity with which base station 105-*j* transmits SS bursts 310, grant bursts 315, or SI bursts 320. The first portion of the set of minimum SI may also include beam-related information that may enable or aid the target device in locating SS bursts 310, grant bursts 315, or SI bursts 320 or the corresponding SS blocks, grant blocks, and SI blocks.

In some cases, the first portion of the set of minimum SI, which may be sent as part of an SS burst 310 and thus as part of one or more references signals (e.g., PSSs, SSSs, and beam reference signals), may include any data normally sent on a PBCH. Thus, transmitting a portion of the set of minimum SI as part of one or more references signals may eliminate the need for the PBCH, or free up the PBCH to carry other information—in either case, system resources are saved. If the PBCH is eliminated, in some cases base station 105-*j* may transmit as part of an SS burst a tertiary synchronization signal (TSS) in addition to a PSS and SSS to carry some or all of the first portion of the set of minimum SI. For example, the TSS may carry timing and index information for an SS burst 310 or other information that may aid a target device in receiving a grant burst 315 or SI burst 320. In some cases, the information about the grant burst 315 or SI burst 320 may be inferable from the timing or index information for an SS burst 310.

When transmitting the first portion of the set of minimum SI as part of one or more reference signals (e.g., PSS, SSS, and TSS), base station 105-*j* may transmit information regarding the control channel corresponding to grant bursts 315 (or the data channel corresponding to SI bursts 320) in a number of ways, in addition to including such information as part of the first portion of the set of minimum SI. For example, the transmission resources or parameter configurations used for one or more of the reference signals may implicitly indicate the transmission resources or parameter configurations used for a control or data channel.

In the example of transmission scheme 600, directional transmissions 305 are used, and the periodic schedule of the references signals, the control channel, and the data channel each include directional transmissions 305 in multiple directions during each period (e.g., beamsweeping), the example transmission scheme 600 should not be construed as limiting. The concepts of transmission scheme 600 (e.g., the timing and transmission resources with which various types of data are transmitted) may equally be utilized without directional transmissions 305, and the blocks within SS bursts 310, grant bursts 315, and SI bursts 320 (and thus the different portions of a set of minimum SI) may be multiplexed within any resource domain, and an SS bursts 310, grant bursts 315, or SI bursts 320 may comprise only a single block. Along with multiplexing in any domain, multiplexing within a resource domain of disjoint transmission resources is possible. Further, Further, in cases a base station 105 other than base station 105-*j* may transmit some of the signals described in connection with transmission scheme 600. For example, a receiving node may receive the one or more reference signals corresponding to SS bursts 310 from base station 105-*j* but may receive the control and data channels respectively corresponding to grant bursts 315 and SI bursts 320 from another base station 105 using the same or different RAT. As an additional example, in some cases base station 105-*j* may not transmit any grant bursts 315 or other information on a control channel associated with the data channel upon which base station 105-*j* transmits SI bursts 320, and a receiving node may locate the data channel by blindly testing multiple hypotheses.

Figure 7:
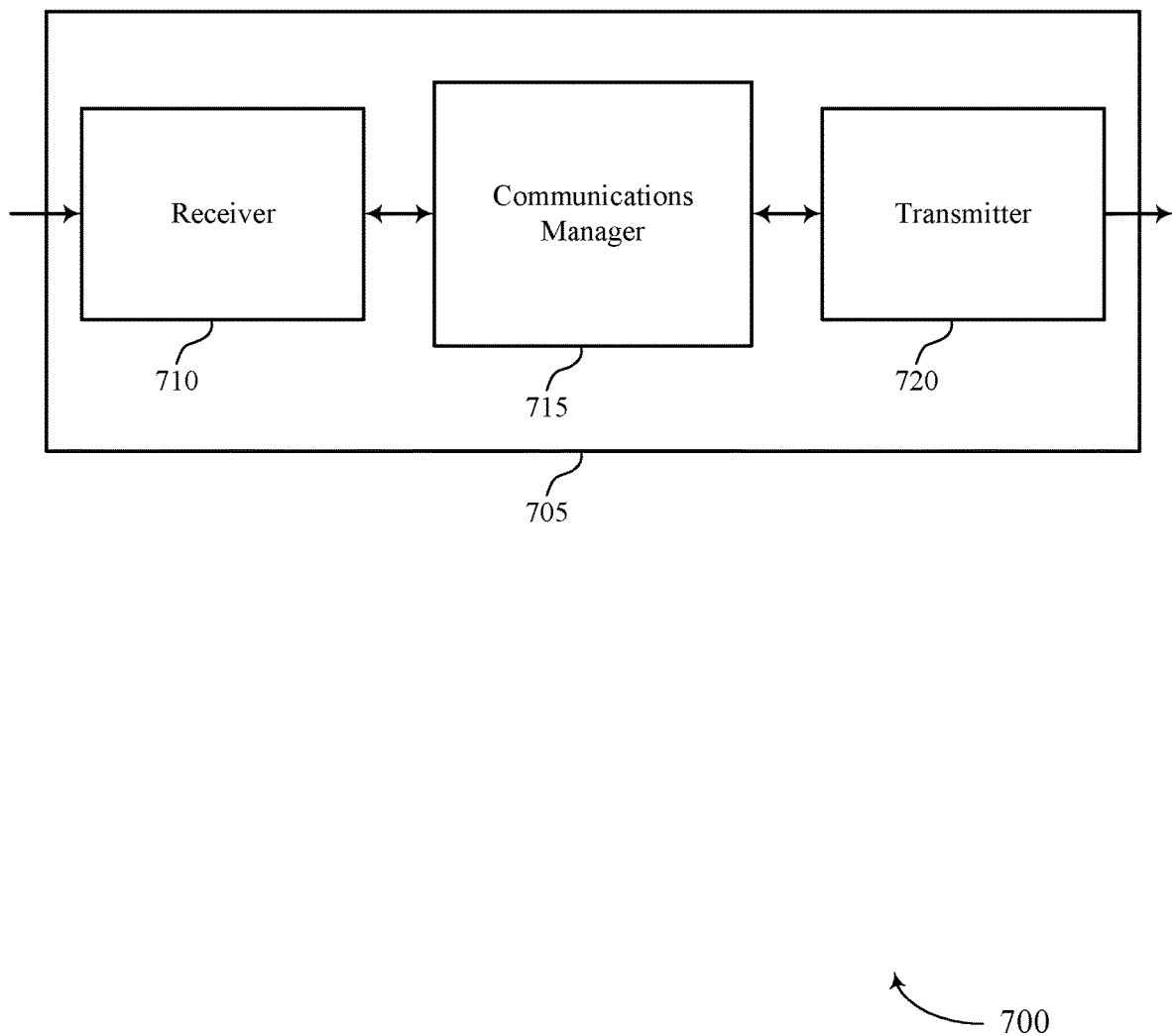
FIGS. 7 and 8 show block diagrams of a device that supports delivery of system information in accordance with aspects of the present disclosure.

FIG. 7 shows a block diagram 700 of a wireless device 705 that supports delivery and reception of system information in accordance with aspects of the present disclosure. Wireless device 705 may be an example of aspects of a UE 115 or base station 105 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to delivery of system information, etc.). Information may be passed on to other components of the device. The receiver 710 may be an example of aspects of the transceiver 935 described with reference to FIG. 9. The receiver 710 may utilize a single antenna or a set of antennas.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Communications manager 715 may be an example of aspects of the communications manager 915 described with reference to FIG. 9.

Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, when wireless device 705 is acting as a transmitting node and delivering SI, communications manager 715 may determine a first set of resource-specific SI that is sufficient for a first set of target wireless devices to access a wireless communications network using a first set of resources and determine a second set of resource-specific SI that is sufficient for a second set of target wireless devices to access the wireless communications network using a second set of resources. In some cases, the wireless devices of the second set of target wireless devices may be capable of accessing the wireless communications network using the first set of resources based on the first set of resource-specific SI and capable of accessing the wireless communications network using the second set of resources based at least in part on the second set of resource-specific SI (e.g., the first set of resource-specific SI may be sufficient for the first set of target wireless devices and sufficient for the second set of target devices to access the wireless communications network using the first set of resources). In some cases, the wireless devices of the first set of target wireless devices may be incapable of accessing the wireless communications network using the second set of resources based on the second set of resource-specific SI (e.g., the second set of resource-specific SI may be sufficient for the second set of target wireless devices and insufficient for the first set of target wireless devices to access the wireless communications network using the second set of resources). Communications manager 715 may then cause transmitter 720 to directionally transmit the first set of resource-specific SI towards the first set of target wireless devices via a first transmission that excludes the second set of resource-specific SI and directionally transmit the second set of resource-specific SI towards the second set of target wireless devices via a second transmission that excludes the first set of resource-specific SI.

As another example, when wireless device 705 is acting as a transmitting node and delivering SI, the communications manager 715 may determine a set of SI, the SI sufficient for a wireless device to access a wireless communications network, transmit a first portion of the set of SI, as part of one or more reference signals, according to a first periodic schedule having a first period, and transmit a second portion of the set of SI, as part of a scheduled data channel, according to a second periodic schedule having a second period, where the scheduled data channel is associated with a corresponding control channel including information regarding the scheduled data channel.

As yet another example, when wireless device 705 is acting as a receiving node attempting to access a network, communications manager 715 may also use a set of received SI to access a wireless communications network. For example, receiver 710 may receive a first portion of a set of SI, as part of one or more reference signals, according to a first periodic schedule having a first period, and also receive a second portion of the set of SI, as part of a scheduled data channel, according to a second periodic schedule having a second period, where the scheduled data channel is associated with a corresponding control channel including information regarding the scheduled data channel. In some cases, receiver 710 may receive the first portion of the set of SI via a first set of transmission resources, and receive the second portion of the set of SI via a second set of transmission resources, where the first set of transmission resources and the second set of transmission resources are multiplexed within one or more transmission resource domains. Receiver 710 may also receive the one or more reference signals from a first transmitting node, and receive the corresponding control channel from a second transmitting node. The scheduled data channel may be a PDSCH, and the corresponding control channel may be a PDCCH. In some cases, the first periodic schedule includes a first schedule of directional transmissions that specifies multiple directional transmissions within the first period, while the second periodic schedule includes a second schedule of directional transmissions that specifies multiple directional transmissions within the second period.

Figure 8:
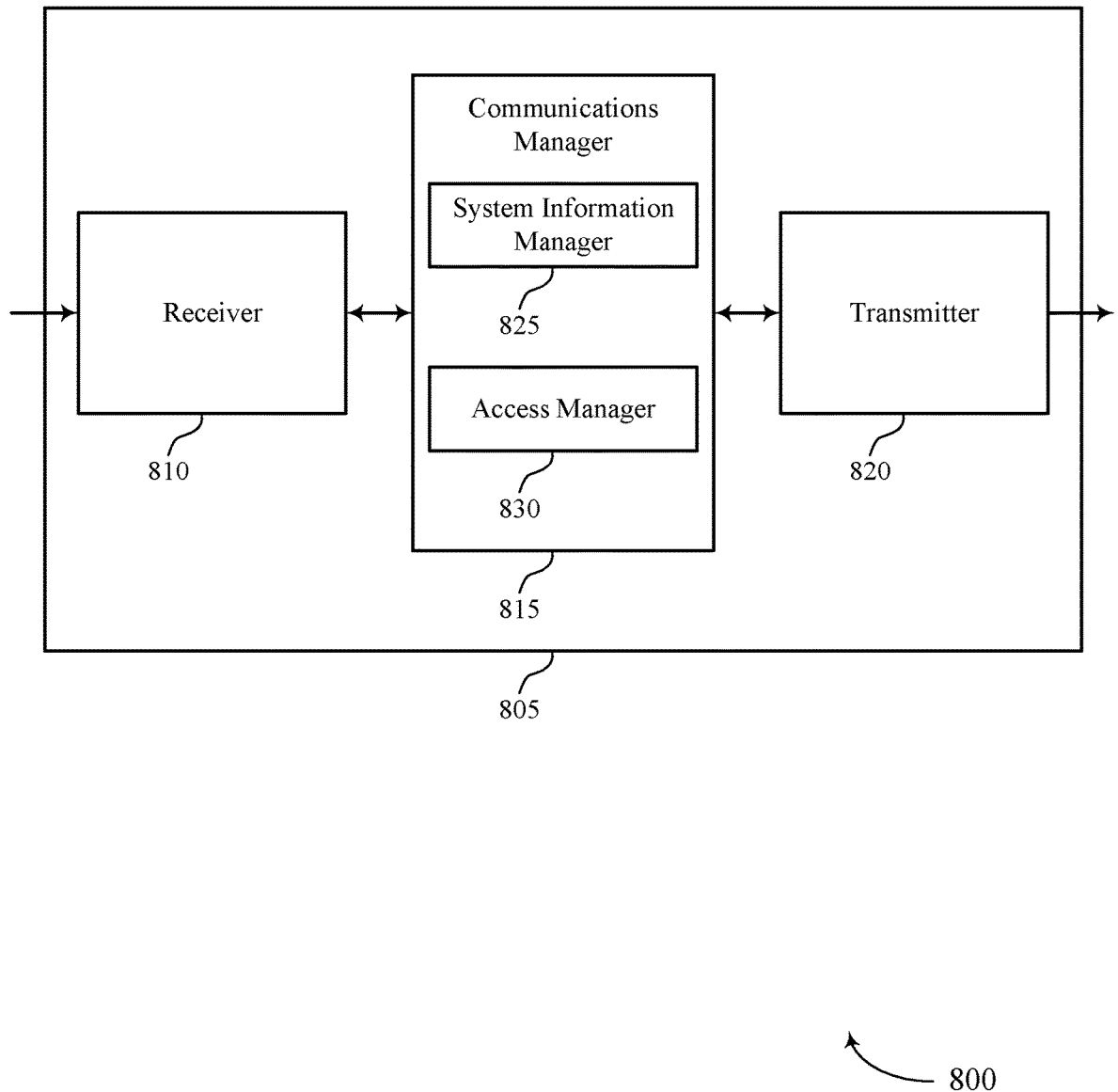

FIG. 8 shows a block diagram 800 of a wireless device 805 that supports delivery and reception of system information in accordance with aspects of the present disclosure. Wireless device 805 may be an example of aspects of a wireless device 705 or a UE 115 or base station 105 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to delivery of system information, etc.). Information may be passed on to other components of the device. The receiver 810 may be an example of aspects of the transceiver 935 described with reference to FIG. 9 or transceiver 1035 described with reference to FIG. 10. The receiver 810 may utilize a single antenna or a set of antennas.

Transmitter 820 may transmit signals generated by other components of the device. In some examples, the transmitter 820 may be collocated with a receiver 810 in a transceiver module. For example, the transmitter 820 may be an example of aspects of the transceiver 935 described with reference to FIG. 9 or transceiver 1035 described with reference to FIG. 10. The transmitter 820 may utilize a single antenna or a set of antennas.

Communications manager 815 may be an example of aspects of the communications manager 915 described with reference to FIG. 9. Communications manager 815 may also include system information manager 825 and access manager 830.

In some cases, wireless device 805 may act as a transmitting node and transmit SI. System information manager 825 may determine a first set of resource-specific SI that is sufficient for a first set of target wireless devices to access a wireless communications network using a first set of resources and determine a second set of resource-specific SI that is sufficient for a second set of target wireless devices to access the wireless communications network using a second set of resources. In some cases, the wireless devices of the second set of target wireless devices may be capable of accessing the wireless communications network using the first set of resources based at least in part on the first set of resource-specific SI and capable of accessing the wireless communications network using the second set of resources based at least in part on the second set of resource-specific SI. System information manager 825 may also cause transmitter 820 to directionally transmit the first set of resource-specific SI towards the first set of target wireless devices via a first transmission that excludes the second set of resource-specific SI and directionally transmit the second set of resource-specific SI towards the second set of target wireless devices via a second transmission that excludes the first set of resource-specific SI. In some cases, system information manager 825 may also cause transmitter 820 to transmit the first set of resource-specific SI using a time, frequency, code, spectrum, or spatial resource specific to the first set of target wireless devices, and transmit the second set of resource-specific SI using a time, frequency, code, spectrum, or spatial resource specific to the second set of target wireless devices. The respective transmission resources may each include multiple sets of related transmission resources.

In some cases, the first set of target wireless devices includes devices having a first location relative to a transmitter and the second set of target wireless devices includes devices having a second location relative to the transmitter. For example, the first location relative to the transmitter may comprise a first set of azimuth and elevation coordinates and the second location relative to the transmitter may comprise a second set of azimuth and elevation coordinates. In some cases, the first set of target wireless devices includes devices of a first device type and the second set of target wireless devices includes devices of a second device type. For example, the first set of target wireless devices may be UEs and the second set of target wireless devices may be base stations, base station relays, or a combination. In some cases, the first set of target wireless devices includes devices in a first geographical area and the second set of target wireless devices includes devices in a second geographical area. In some other cases, the first set of target wireless devices includes devices having a first set of capabilities and the second set of target wireless devices includes devices having a second set of capabilities. The capabilities may include beam correspondence capabilities, transmission power capabilities, radio frequency capabilities, digital processing capabilities, spatial division multiplexing capabilities, or any combination thereof. In some cases, the first set of target wireless devices includes devices having a first set of network privileges (e.g., camping privileged) and the second set of target wireless devices includes devices having a second set of network privileges.

In some cases, the sets of resource-specific SI determined by system information manager 825 comprise MIB data, SIB data, MSIB data, RMSI data, or any combination thereof. The sets of resource-specific SI may also include RACH parameters. In some cases, the RACH parameters include time resource configurations, frequency resource configurations, numerology configurations, preamble configurations, power control configurations, or any combination thereof. In some cases, the first set of resource-specific SI includes an identification of suitability for the first set of target wireless devices. In some cases, the second set of resource-specific SI includes an identification of suitability for the second set of target wireless devices. In some cases, the first set of resource-specific SI includes a first set of beamforming parameters, while the second set of resource-specific SI includes a second set of beamforming parameters.

System information manager 825 may also subdivide a set of resource-specific SI into two or more portions. In some cases, a first portion includes MIB data and a second portion includes RMSI data. The first portion may include data that is common across the first set of resource-specific SI and the second set of resource-specific SI, such as common MIB data. system information manager 825 may also cause transmitter 820 to transmit a first portion of the second set of resource-specific SI as part of a non-scheduled channel, and transmit a second portion of the second set of resource-specific SI as part of a scheduled channel, the scheduled channel having an associated control channel.

As another example, when wireless device 805 is acting as a transmitting node and transmitting SI, system information manager 825 may determine a set of SI, the SI sufficient for a wireless device to access a wireless communications network. System information manager 825 may also cause transmitter 820 to transmit a first portion of the set of SI, as part of one or more reference signals, according to a first periodic schedule having a first period, and to transmit a second portion of the set of SI, as part of a scheduled data channel, according to a second periodic schedule having a second period, where the scheduled data channel is associated with a corresponding control channel including information regarding the scheduled data channel. The second period may be greater than the first period. In some cases, the first periodic schedule includes a first schedule of directional transmissions that specifies multiple directional transmissions within the first period, while the second periodic schedule includes a second schedule of directional transmissions that specifies multiple directional transmissions within the second period.

In some cases, transmitting the first portion of the set of SI, as part of one or more reference signals, includes transmitting the first portion of the set of SI as part of a PSS, a SSS, a TSS, a beam reference signal, or any combination The first portion of the set of SI may include information about the corresponding control channel. In some cases, system information manager 825 may cause transmitter 820 to transmit the first portion of the set of SI, as part of one or more reference signals, using a set of reference signal transmission resources indicative of a set of control channel transmission resources used to transmit the corresponding control channel. System information manager 825 may cause transmitter 820 to transmit the one or more reference signals using a reference signal configuration indicative of a control channel configuration used for the corresponding control channel. For example, the reference signal configuration may be indicative of a control channel configuration that may include a configuration of modulation and coding scheme (MCS) parameters, numerology parameters, transmission layer parameters, port parameters, demodulation reference signal parameters, or any combination thereof.

System information manager 825 may also cause transmitter 820 to transmit the corresponding control channel according to a third schedule, which may include a fixed temporal offset relative to the first periodic schedule. In some cases, transmitting the corresponding control channel according to the third schedule including the fixed temporal offset relative to the first periodic schedule includes transmitting the corresponding control channel within a temporal window, the temporal window spanning a set duration of time and beginning at a time based on the fixed temporal offset. In some cases, the corresponding control channel may be a PDCCH and the scheduled data channel may be a PDSCH.

In some cases, system information manager 825 may also cause transmitter 820 to transmit the first portion of the set of SI using a first set of transmission resources, and transmit the second portion of the set of SI using a second set of transmission resources, where the first set of transmission resources and the second set of transmission resources are multiplexed within one or more transmission resource domains (e.g., time, frequency, code, spatial, component carrier, or spectrum domains).

System information manager 825 may determine the set of SI by determining MIB data, RMSI data, or any combination thereof. In some cases, determining the set of SI further includes determining one or more RACH parameters. In some cases, the RACH parameters include time resource configurations, frequency resource configurations, numerology configurations, preamble configurations, power control configurations, or any combination thereof.

System information manager 825 may also subdivide the set of SI into two or more portions. In some cases, the first portion of the set of SI may include index information regarding a PSS, index information regarding a SSS, information regarding a transmission resource used to transmit the one or more reference signals, information regarding a transmission resource used to transmit the second portion of the set of SI, information regarding a numerology for the corresponding control channel, information regarding a numerology for the data channel, information regarding device privileges for the network, information regarding the first periodic schedule, information regarding the second periodic schedule, beam-related information, a subset of MIB data, a subset of RMSI data, or any combination thereof.

As yet another example, wireless device 805 may also act as a receiving node and receive SI, in which case access manager 830 may use a received set of SI to access a wireless communications network. A transmitting node in the wireless communications network may include aspects of wireless communications systems 100, 200, and 300 and may have sent the SI according to any of the SI transmission techniques described herein.

Further, receiver 810 may in some cases receive one or more reference signals carrying a first portion of the set of SI from a first transmitting node, and receive a control channel corresponding to a data channel carrying a second portion of the set of SI from a second transmitting node. Access manager 830 may also have located the scheduled data channel by blindly testing multiple hypotheses.

Figure 9:
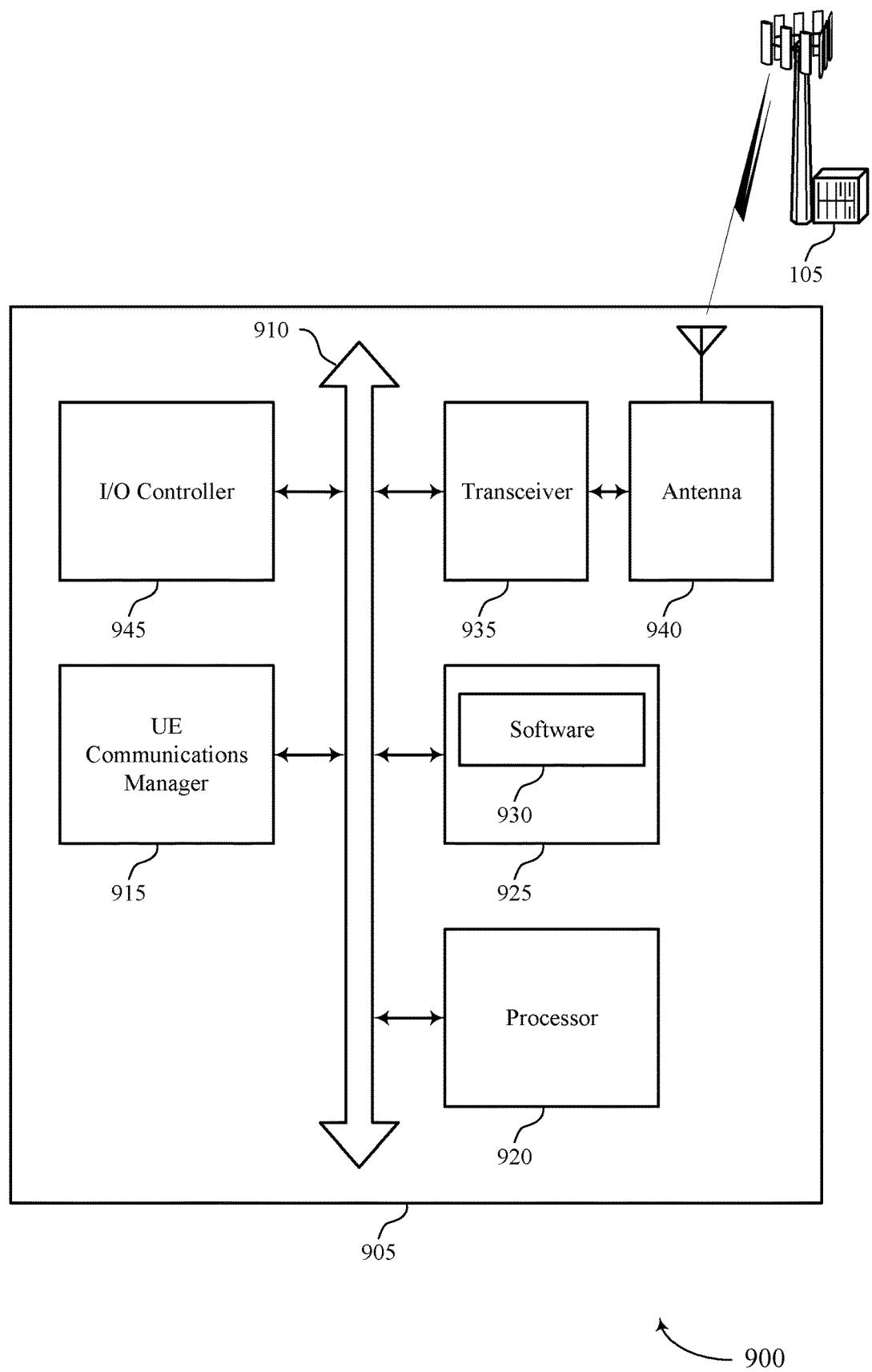
FIG. 9 illustrates a block diagram of a system including a UE that supports delivery of system information in accordance with aspects of the present disclosure.

FIG. 9 shows a diagram of a system 900 including a device 905 that supports delivery of system information in accordance with aspects of the present disclosure. Device 905 may be an example of or include the components of wireless device 705, wireless device 805, or a UE 115 as described above, e.g., with reference to FIGS. 7 and 8. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting delivery of system information).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support delivery of system information. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
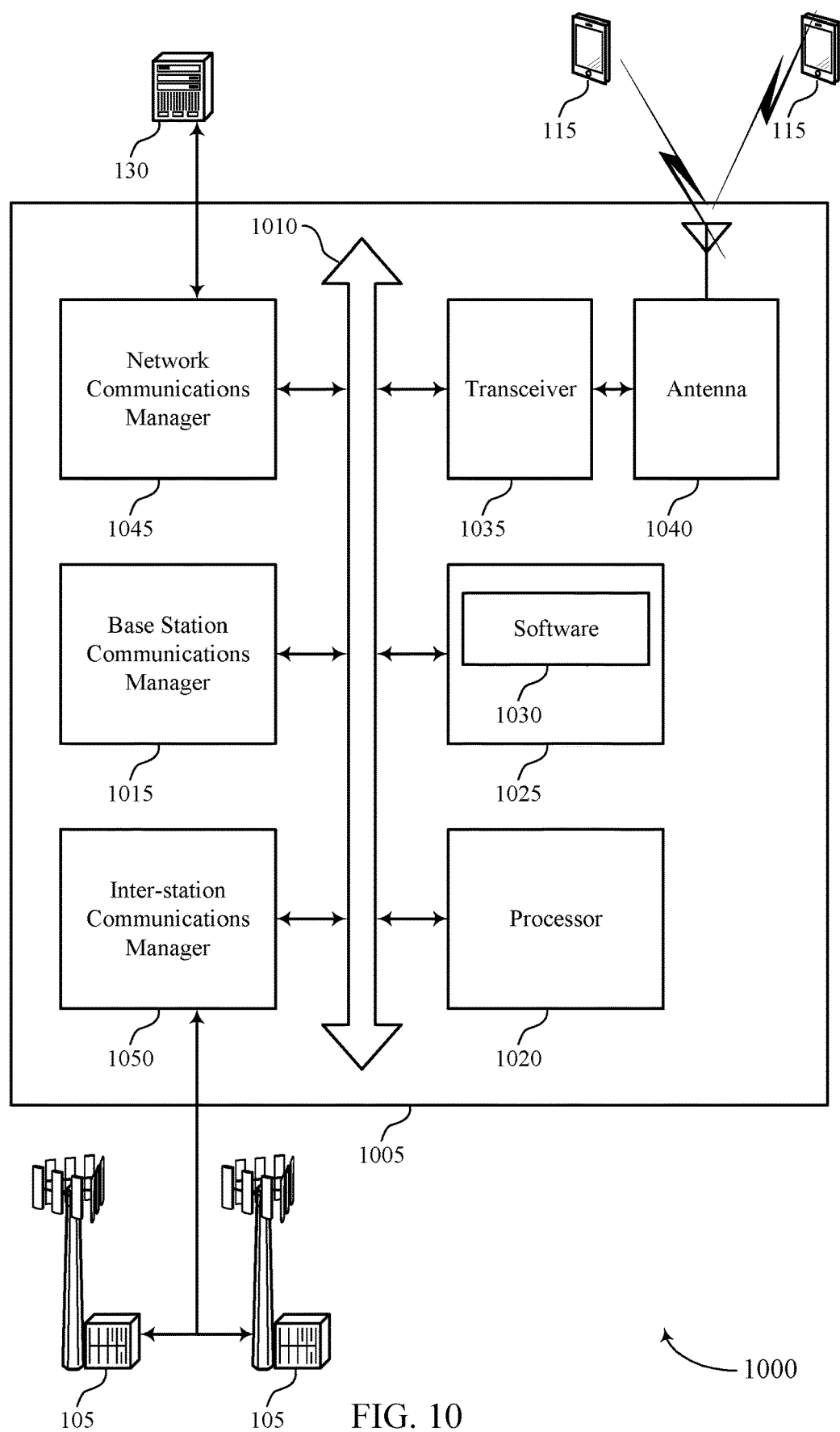
FIG. 10 illustrates a block diagram of a system including a base station that supports delivery of system information in accordance with aspects of the present disclosure.

FIG. 10 shows a diagram of a system 1000 including a device 1005 that supports delivery of system information in accordance with aspects of the present disclosure. Device 1005 may be an example of or include the components of wireless device 805, wireless device 705, or a base station 105 or UE 115 as described above, e.g., with reference to FIGS. 8 and 7. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting delivery of system information).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support delivery of system information. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communications network technology to provide communications between base stations 105.

Figure 11:
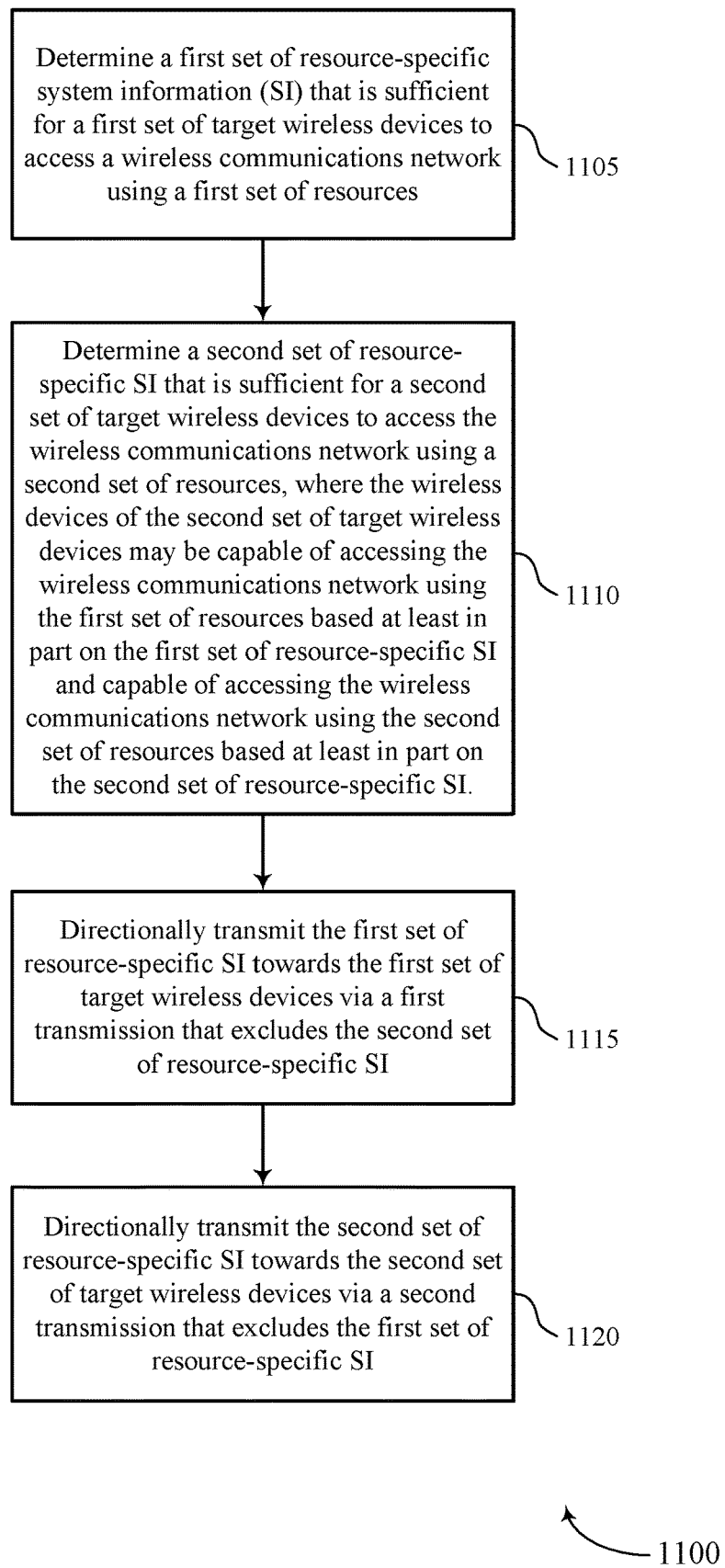
FIGS. 11 through 13 illustrate methods for delivery of system information in accordance with aspects of the present disclosure.

FIG. 11 shows a flowchart illustrating a method 1100 for delivery of system information in accordance with aspects of the present disclosure. The operations of method 1100 may be implemented by a UE 115 or base station 105 or its components as described herein. For example, the operations of method 1100 may be performed by a communications manager as described with reference to FIGS. 7 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may determine a first set of resource-specific SI that is sufficient for a first set of target wireless devices to access a wireless communications network using a first set of resources. The operations of block 1105 may be performed according to the methods described herein. In certain examples, aspects of the operations of block 1105 may be performed by a system information manager as described with reference to FIGS. 7 through 8.

At block 1110 the UE 115 or base station 105 may determine a second set of resource-specific SI that is sufficient for a second set of target wireless devices to access the wireless communications network using a second set of resources, where the wireless devices of the second set of target wireless devices may be capable of accessing the wireless communications network using the first set of resources based at least in part on the first set of resource-specific SI and capable of accessing the wireless communications network using the second set of resources based at least in part on the second set of resource-specific SI. The operations of block 1110 may be performed according to the methods described herein. In certain examples, aspects of the operations of block 1110 may be performed by a system information manager as described with reference to FIGS. 7 through 8.

At block 1115 the UE 115 or base station 105 may directionally transmit the first set of resource-specific SI towards the first set of target wireless devices via a first transmission that excludes the second set of resource-specific SI. The operations of block 1115 may be performed according to the methods described herein. In certain examples, aspects of the operations of block 1115 may be performed by a transmitter as described with reference to FIGS. 7 through 8.

At block 1120 the UE 115 or base station 105 may directionally transmit the second set of resource-specific SI towards the second set of target wireless devices via a second transmission that excludes the first set of resource-specific SI. The operations of block 1120 may be performed according to the methods described herein. In certain examples, aspects of the operations of block 1120 may be performed by a transmitter as described with reference to FIGS. 7 through 8.

Figure 12:
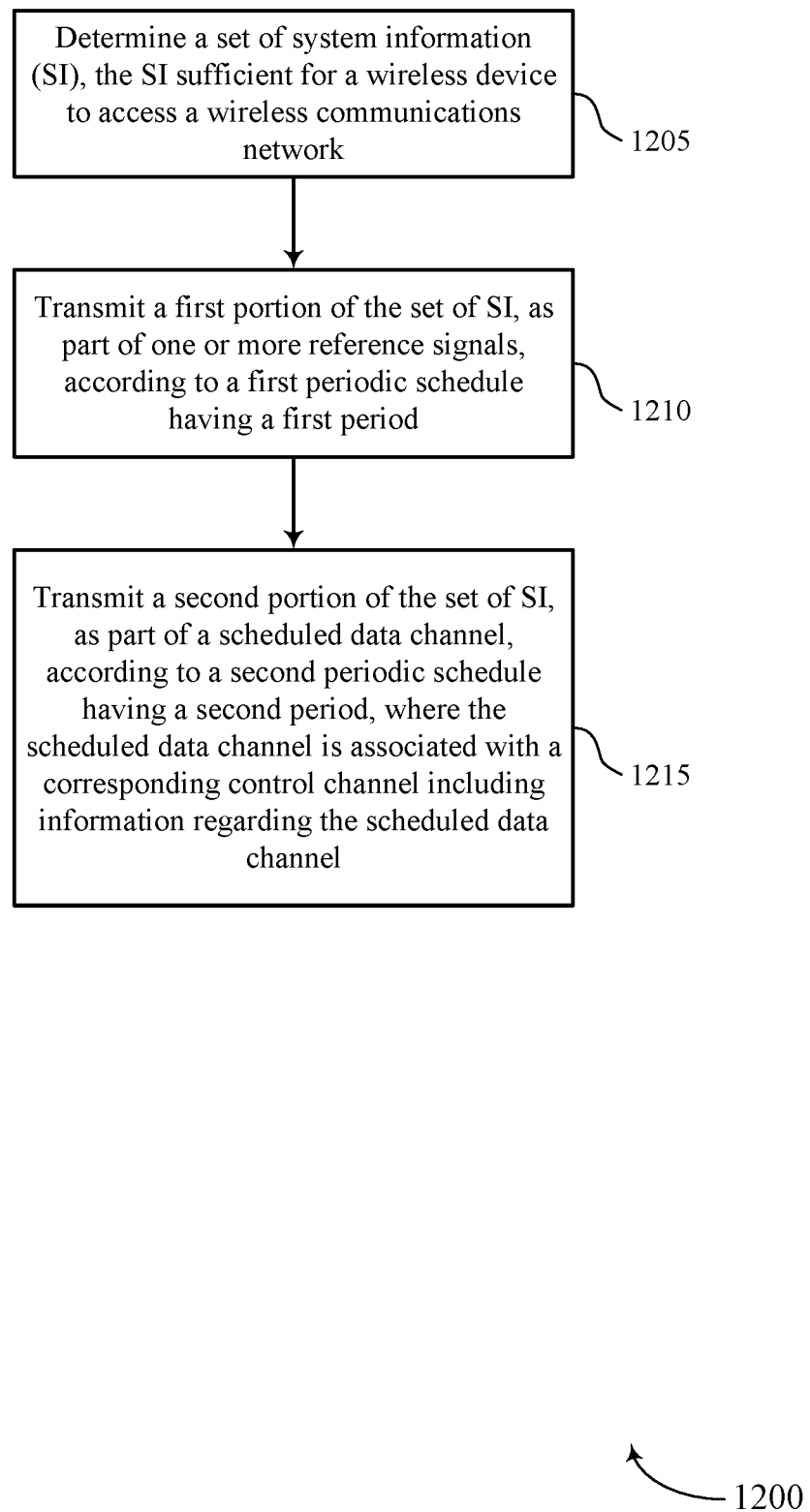

FIG. 12 shows a flowchart illustrating a method 1200 for delivery of system information in accordance with aspects of the present disclosure. The operations of method 1200 may be implemented by a UE 115 or base station 105 or its components as described herein. For example, the operations of method 1200 may be performed by a communications manager as described with reference to FIGS. 7 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may determine a set of SI, the SI sufficient for a wireless device to access a wireless communications network. The operations of block 1205 may be performed according to the methods described herein. In certain examples, aspects of the operations of block 1205 may be performed by a system information manager as described with reference to FIGS. 7 through 8.

At block 1210 the UE 115 or base station 105 may transmit a first portion of the set of SI, as part of one or more reference signals, according to a first periodic schedule having a first period. The operations of block 1210 may be performed according to the methods described herein. In certain examples, aspects of the operations of block 1210 may be performed by a transmitter as described with reference to FIGS. 7 through 8.

At block 1215 the UE 115 or base station 105 may transmit a second portion of the set of SI, as part of a scheduled data channel, according to a second periodic schedule having a second period, wherein the scheduled data channel is associated with a corresponding control channel comprising information regarding the scheduled data channel. The operations of block 1215 may be performed according to the methods described herein. In certain examples, aspects of the operations of block 1215 may be performed by a transmitter as described with reference to FIGS. 7 through 8.

Figure 13:
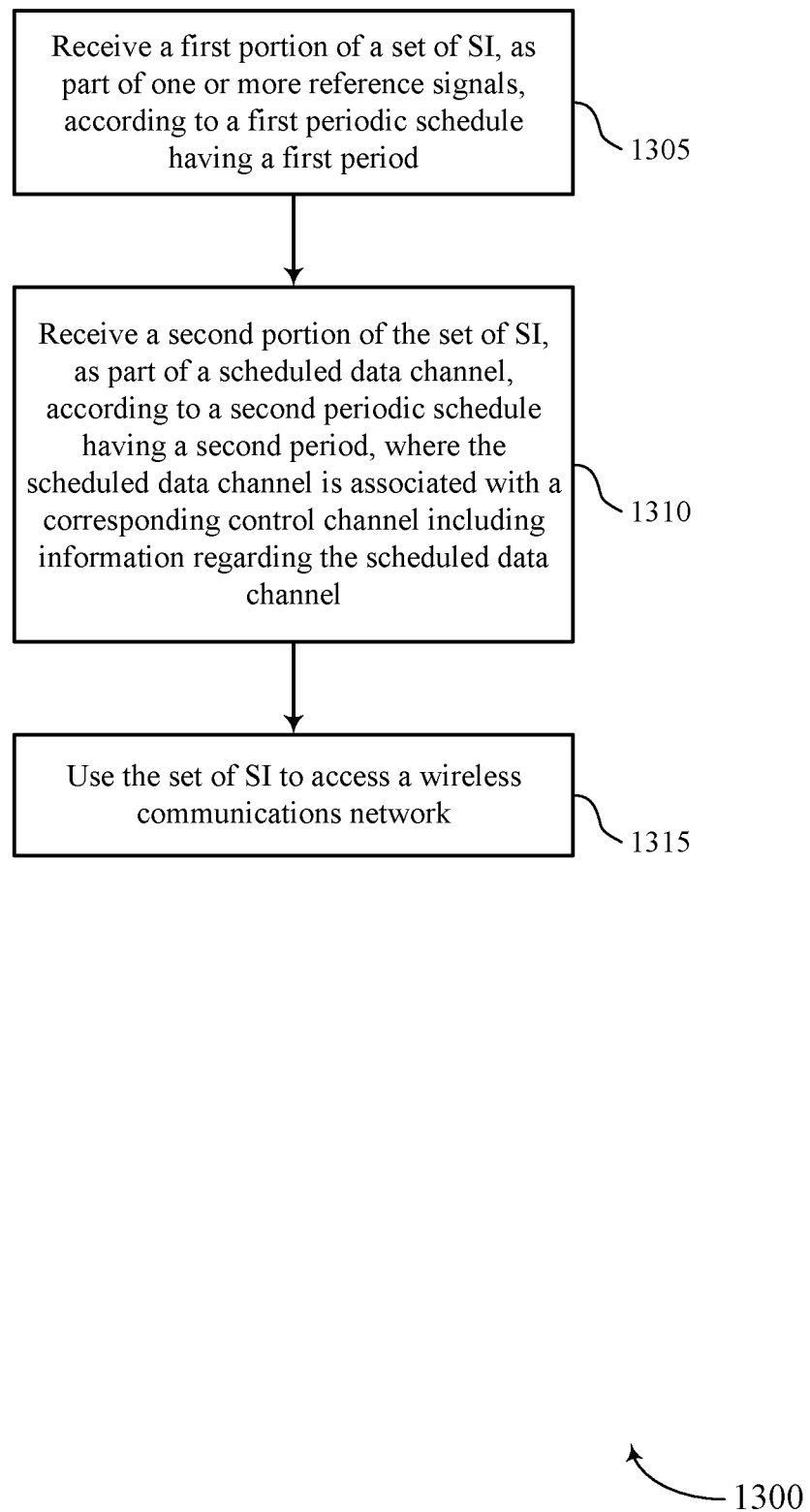

FIG. 13 shows a flowchart illustrating a method 1300 for delivery of system information in accordance with aspects of the present disclosure. The operations of method 1300 may be implemented by a UE 115 or base station 105 or its components as described herein. For example, the operations of method 1300 may be performed by a communications manager as described with reference to FIGS. 7 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may receive a first portion of a set of SI, as part of one or more reference signals, according to a first periodic schedule having a first period. The operations of block 1305 may be performed according to the methods described herein. In certain examples, aspects of the operations of block 1305 may be performed by a receiver as described with reference to FIGS. 7 through 8.

At block 1310 the UE 115 or base station 105 may receive a second portion of the set of SI, as part of a scheduled data channel, according to a second periodic schedule having a second period, wherein the scheduled data channel is associated with a corresponding control channel comprising information regarding the scheduled data channel. The operations of block 1310 may be performed according to the methods described herein. In certain examples, aspects of the operations of block 1310 may be performed by a receiver as described with reference to FIGS. 7 through 8.

At block 1315 the UE 115 or base station 105 may use the set of SI to access a wireless communications network. The operations of block 1315 may be performed according to the methods described herein. In certain examples, aspects of the operations of block 1315 may be performed by a access manager as described with reference to FIGS. 7 through 8.

In some examples, aspects from two or more of the described methods may be combined. It should be noted that the described methods are just example implementations, and that the operations of the described methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining a first set of resource-specific system information (SI) that is sufficient for a first set of target wireless devices to access a wireless communications network using a first set of resources;
   determining a second set of resource-specific SI that is sufficient for a second set of target wireless devices to access the wireless communications network using a second set of resources, wherein the wireless devices of the second set of target wireless devices are capable of accessing the wireless communications network using the first set of resources based at least in part on the first set of resource-specific SI and capable of accessing the wireless communications network using the second set of resources based at least in part on the second set of resource-specific SI;
   directionally transmitting, using a first set of beamforming parameters corresponding to a first direction, the first set of resource-specific SI in the first direction towards the first set of target wireless devices via a first transmission that excludes the second set of resource-specific SI, the first set of resource-specific SI identifying the first set of resources for devices located in the first direction to access the wireless communications network; and
   directionally transmitting, using a second set of beamforming parameters corresponding to a second direction, the second set of resource-specific SI in the second direction towards the second set of target wireless devices via a second transmission that excludes the first set of resource-specific SI, the second set of resource-specific SI identifying the second set of resources for devices located in the second direction to access the wireless communications network, wherein the second direction is different than the first direction.

2. The method of claim 1, further comprising:
   transmitting the first set of resource-specific SI using a time, frequency, code, spectrum, or spatial resource specific to the first set of target wireless devices; and
   transmitting the second set of resource-specific SI using a time, frequency, code, spectrum, or spatial resource specific to the second set of target wireless devices.

3. The method of claim 1, wherein:
   the first set of resource-specific SI comprises a third set of beamforming parameters; and
   the second set of resource-specific SI comprises a fourth set of beamforming parameters.

4. The method of claim 1, further comprising:
   transmitting a first portion of the second set of resource-specific SI as part of a non-scheduled channel; and
   transmitting a second portion of the second set of resource-specific SI as part of a scheduled channel, the scheduled channel having an associated control channel.

5. The method of claim 4, wherein:
   the first portion comprises master information block (MIB) data and the second portion comprises remaining minimum system information (RMSI) data.

6. The method of claim 4, wherein:
   the first portion comprises data that is common across the first set of resource-specific SI and the second set of resource-specific SI.

7. The method of claim 1, wherein:
   the respective transmission resources each comprise multiple sets of related transmission resources.

8. The method of claim 1, wherein:
   the SI comprises master information block (MIB) data, system information block (SIB) data, minimum system information block (MSIR) data, remaining minimum system information block (RMSI) data, random access channel (RACH) parameters, or any combination thereof.

9. The method of claim 1, wherein:
   the first set of resource-specific SI comprises an identification of suitability for the first set of target wireless devices; and
   the second set of resource-specific SI comprises an identification of suitability for the second set of target wireless devices.

10. The method of claim 1, wherein:
    the first set of target wireless devices comprises devices having a first location relative to a transmitter and the second set of target wireless devices comprises devices having a second location relative to the transmitter.

11. The method of claim 1, wherein:
    the first set of target wireless devices comprises user equipments (UEs) and the second set of target wireless devices comprises base stations, base station relays, or a combination thereof.

12. The method of claim 1, wherein:
    the first set of target wireless devices comprises devices having a first set of capabilities and the second set of target wireless devices comprises devices having a second set of capabilities, wherein the first set of capabilities or the second set of capabilities comprises beam correspondence capabilities, transmission power capabilities, radio frequency capabilities, digital processing capabilities, spatial division multiplexing capabilities, or any combination thereof.

13. The method of claim 1, wherein:
    the first set of target wireless devices comprises devices having a first set of network privileges and the second set of target wireless devices comprises devices having a second set of network privileges.

14. A method for wireless communication, comprising:
determining a set of system information (SI), the SI sufficient for a wireless device to access a wireless communications network;
transmitting a first portion of the set of SI, as part of one or more reference signals, according to a first periodic schedule having a first period, the first periodic schedule based at least in part on the SI included in the first portion of the set of SI; and
transmitting a second portion of the set of SI, as part of a scheduled data channel, according to a second periodic schedule having a second period, the second periodic schedule based at least in part on the SI included in the second portion of the set of SI, wherein the scheduled data channel is associated with a corresponding control channel comprising information regarding the scheduled data channel, wherein the first portion of the set of SI and the second portion of the set of SI comprise different sets of information for devices to access the wireless communications network, and wherein the second periodic schedule and the first periodic schedule are different.

15. The method of claim 14, wherein transmitting the first portion of the set of SI, as part of one or more reference signals, comprises:
transmitting the first portion of the set of SI as part of a primary synchronization signal (PSS), a secondary synchronization signal (SSS), a tertiary synchronization signal (TSS), a beam reference signal, or any combination thereof.

16. The method of claim 14, wherein transmitting the first portion of the set of SI, as part of one or more reference signals, comprises:
transmitting information about the corresponding control channel.

17. The method of claim 14, further comprising:
transmitting the corresponding control channel according to a third schedule comprising a fixed temporal offset relative to the first periodic schedule.

18. The method of claim 14, wherein:
the first portion of the set of SI comprises: index information regarding a primary synchronization signal (PSS), index information regarding a secondary synchronization signal (SSS), information regarding a transmission resource used to transmit the one or more reference signals, information regarding a transmission resource used to transmit the second portion of the set of SI, information regarding a numerology for the corresponding control channel, information regarding a numerology for the data channel, information regarding device privileges for the network, information regarding the first periodic schedule, information regarding the second periodic schedule, beam-related information, a subset of master information block (MIB) data, a subset of remaining minimum system information (RMSI) data, or any combination thereof.

19. The method of claim 14, wherein:
the first periodic schedule comprises a first schedule of directional transmissions that specifies multiple directional transmissions within the first period; and
the second periodic schedule comprises a second schedule of directional transmissions that specifies multiple directional transmissions within the second period.

20. The method of claim 14, further comprising:
transmitting the first portion of the set of SI using a first set of transmission resources; and
transmitting the second portion of the set of SI using a second set of transmission resources, wherein the first set of transmission resources and the second set of transmission resources are multiplexed within one or more transmission resource domains.

21. A method for wireless communication, comprising:
receiving a first portion of a set of system information (SI), as part of one or more reference signals, according to a first periodic schedule having a first period, the first periodic schedule based at least in part on the SI included in the first portion of the set of SI;
receiving a second portion of the set of SI, as part of a scheduled data channel, according to a second periodic schedule having a second period, the second periodic schedule based at least in part on the SI included in the second portion of the set of SI, wherein the scheduled data channel is associated with a corresponding control channel comprising information regarding the scheduled data channel, wherein the first portion of the set of SI and the second portion of the set of SI comprise different sets of information for devices to access a wireless communications network, and wherein the second periodic schedule and the first periodic schedule are different; and
using the set of SI to access the wireless communications network.

22. The method of claim 21, wherein receiving the first portion of the set of SI, as part of one or more reference signals, comprises:
receiving the first portion of the set of SI as part of a primary synchronization signal (PSS), a secondary synchronization signal (SSS), a tertiary synchronization signal (TSS), a beam reference signal, or any combination thereof.

23. The method of claim 21, wherein receiving the first portion of the set of SI, as part of one or more reference signals, comprises:
receiving information about the corresponding control channel.

24. The method of claim 21, further comprising:
receiving the corresponding control channel according to a third schedule comprising a fixed temporal offset relative to the first periodic schedule.

25. The method of claim 21, wherein:
the first portion of the set of SI comprises: index information regarding a primary synchronization signal (PSS), index information regarding a secondary synchronization signal (SSS), information regarding a transmission resource used to transmit the one or more reference signals, information regarding a transmission resource used to transmit the second portion of the set of SI, information regarding a numerology for the corresponding control channel, information regarding a numerology for the data channel, information regarding device privileges for the network, information regarding the first periodic schedule, information regarding the second periodic schedule, beam-related information, a subset of master information block (MIB) data, a subset of remaining minimum system information (RMSI) data, or any combination thereof.

26. The method of claim 21, wherein:
the first periodic schedule comprises a first schedule of directional transmissions that specifies multiple directional transmissions within the first period; and the second periodic schedule comprises a second schedule of directional transmissions that specifies multiple directional transmissions within the second period.

27. The method of claim 21, further comprising:
receiving the first portion of the set of SI via a first set of transmission resources; and
receiving the second portion of the set of SI via a second set of transmission resources, wherein the first set of transmission resources and the second set of transmission resources are multiplexed within one or more transmission resource domains.

28. The method of claim 21, further comprising:
receiving the one or more reference signals from a first transmitting node; and
receiving the corresponding control channel from a second transmitting node.

29. The method of claim 21, further comprising:
locating the scheduled data channel by blindly testing multiple hypotheses.

30. An apparatus for wireless communication, comprising:
a processor;
memory in electronic communication with the processor; and
instructions stored in the memory and executable by the processor to cause the apparatus to:
determine a first set of resource-specific system information (SI) that is sufficient for a first set of target wireless devices to access a wireless communications network using a first set of resources;
determine a second set of resource-specific SI that is sufficient for a second set of target wireless devices to access the wireless communications network using a second set of resources, wherein the wireless devices of the second set of target wireless devices are capable of accessing the wireless communications network using the first set of resources based at least in part on the first set of resource-specific SI and capable of accessing the wireless communications network using the second set of resources based at least in part on the second set of resource-specific SI;
directionally transmit, using a first set of beamforming parameters corresponding to a first direction, the first set of resource-specific SI in the first direction towards the first set of target wireless devices via a first transmission that excludes the second set of resource-specific SI, the first set of resource-specific SI identifying the first set of resources for devices located in the first direction to access the wireless communications network; and
directionally transmit, using a second set of beamforming parameters corresponding to a second direction, the second set of resource-specific SI in the second direction towards the second set of target wireless devices via a second transmission that excludes the first set of resource-specific SI, the second set of resource-specific SI identifying the second set of resources for devices located in the second direction to access the wireless communications network, wherein the second direction is different than the first direction.

* * * * *